US012501899B2

(12) United States Patent
Pade et al.

(10) Patent No.: US 12,501,899 B2
(45) Date of Patent: Dec. 23, 2025

(54) MITE INFESTATION TREATMENT

(71) Applicant: VETO-PHARMA, Palaiseau (FR)

(72) Inventors: Rémi Pade, Coulaines (FR); Gaël Charpentier, Argenton-sur-Creuse (FR); Isabelle Villard, Coubron (FR)

(73) Assignee: VETO-PHARMA, Palaiseau (FR)

( * ) Notice: Subject to any disclaimer, the term of this patent is extended or adjusted under 35 U.S.C. 154(b) by 723 days.

(21) Appl. No.: 17/784,420

(22) PCT Filed: Dec. 11, 2020

(86) PCT No.: PCT/FR2020/052402
§ 371 (c)(1),
(2) Date: Jun. 10, 2022

(87) PCT Pub. No.: WO2021/116631
PCT Pub. Date: Jun. 17, 2021

(65) Prior Publication Data
US 2023/0023961 A1    Jan. 26, 2023

(30) Foreign Application Priority Data
Dec. 13, 2019 (WO) ................. PCT/FR2019/053064

(51) Int. Cl.
*A01N 43/50* (2006.01)
*A01P 7/02* (2006.01)
*A61K 31/4164* (2006.01)
*A61P 33/14* (2006.01)

(52) U.S. Cl.
CPC ............... *A01N 43/50* (2013.01); *A01P 7/02* (2021.08); *A61K 31/4164* (2013.01); *A61P 33/14* (2018.01)

(58) Field of Classification Search
None
See application file for complete search history.

(56) References Cited

FOREIGN PATENT DOCUMENTS

| WO | 2010064013 | A2 | 6/2010 | |
|---|---|---|---|---|
| WO | 2010064013 | A3 | 6/2010 | |
| WO | 2015112090 | A1 | 7/2015 | |
| WO | WO-2019089631 | A1 * | 5/2019 | ............. A61K 45/06 |

OTHER PUBLICATIONS

International Search Report for International Application No. PCT/FR2020/052402 mailed on Mar. 25, 2021, 3 pages.
Johnson et al., "Pesticides and honey bee toxicity—USA", Apidologie, 2010, vol. 41, No. 3, pp. 312-331.
Riva et al., "In silico chemical library screening and experimental validation of novel compounds with potential varroacide activities", Pesticide Biochemistry and Physiology, 2019, vol. 160, pp. 11-19.

\* cited by examiner

*Primary Examiner* — Dominic Lazaro
(74) *Attorney, Agent, or Firm* — MH2 Technology Law Group, LLP

(57) ABSTRACT

The invention relates to a compound of formula (I), a salt thereof or a composition containing same as an acaricide, a method for reducing or preventing an infestation of an animal by a mite, comprising exposing the mite to a compound of formula (I), to a composition comprising a compound of formula (I), to one or more attractants for bees and a polymer, to a strap adapted for use in apiculture comprising a compound of formula (I) and to a hive comprising a compound of formula (I).

15 Claims, 25 Drawing Sheets

[Fig. 1A]
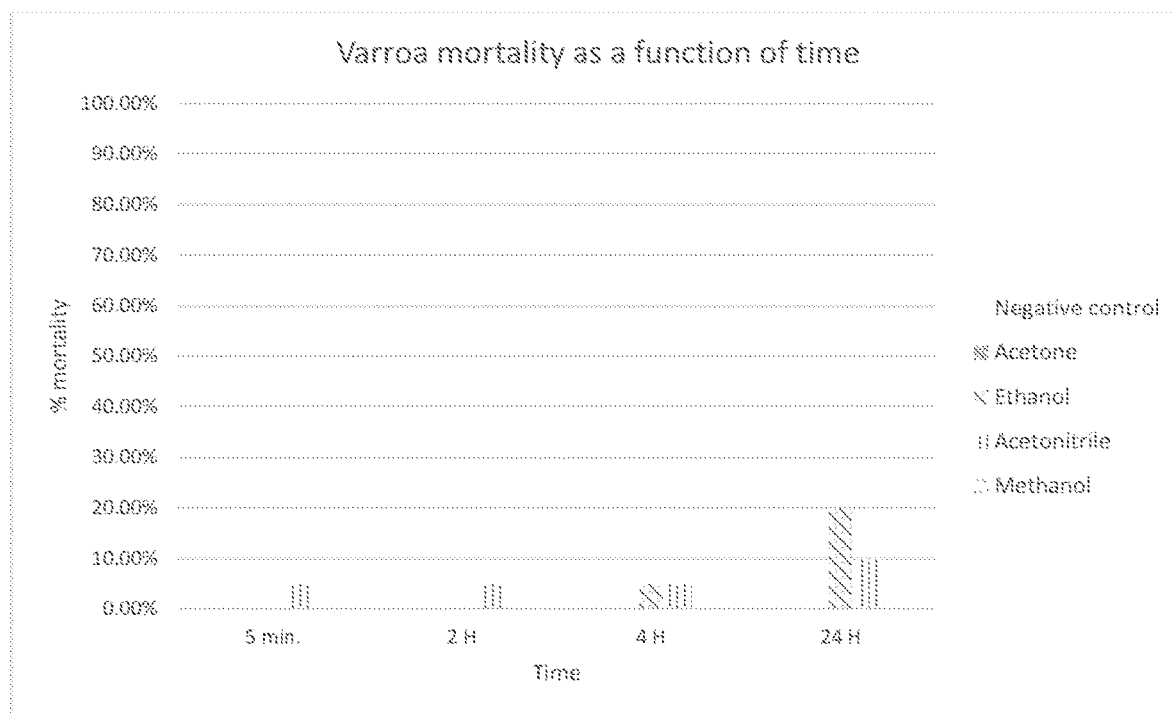

[Fig. 1B]
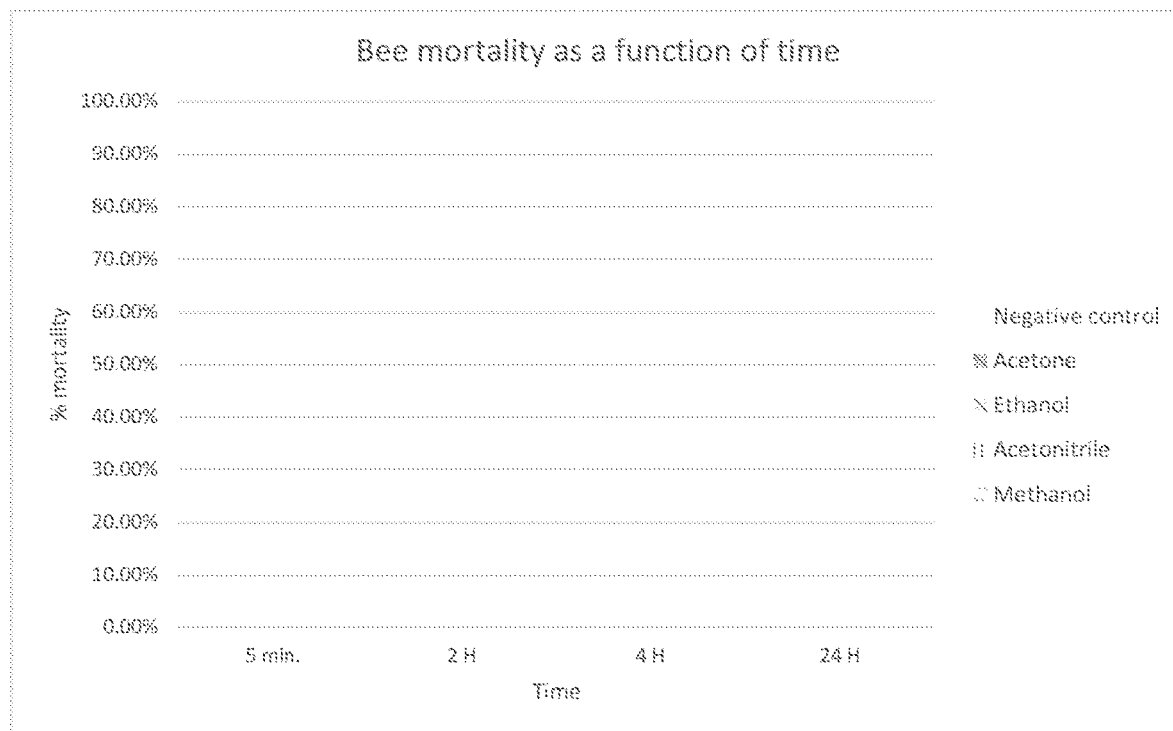

[Fig. 2A]
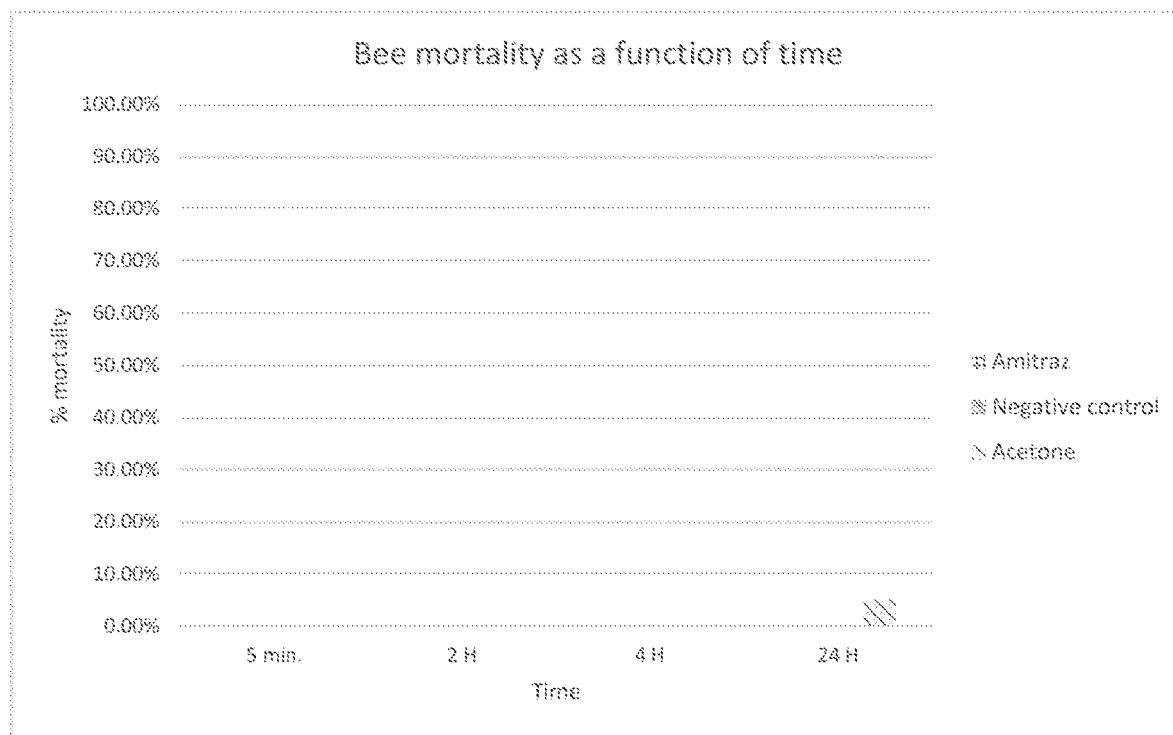

[Fig. 2B]
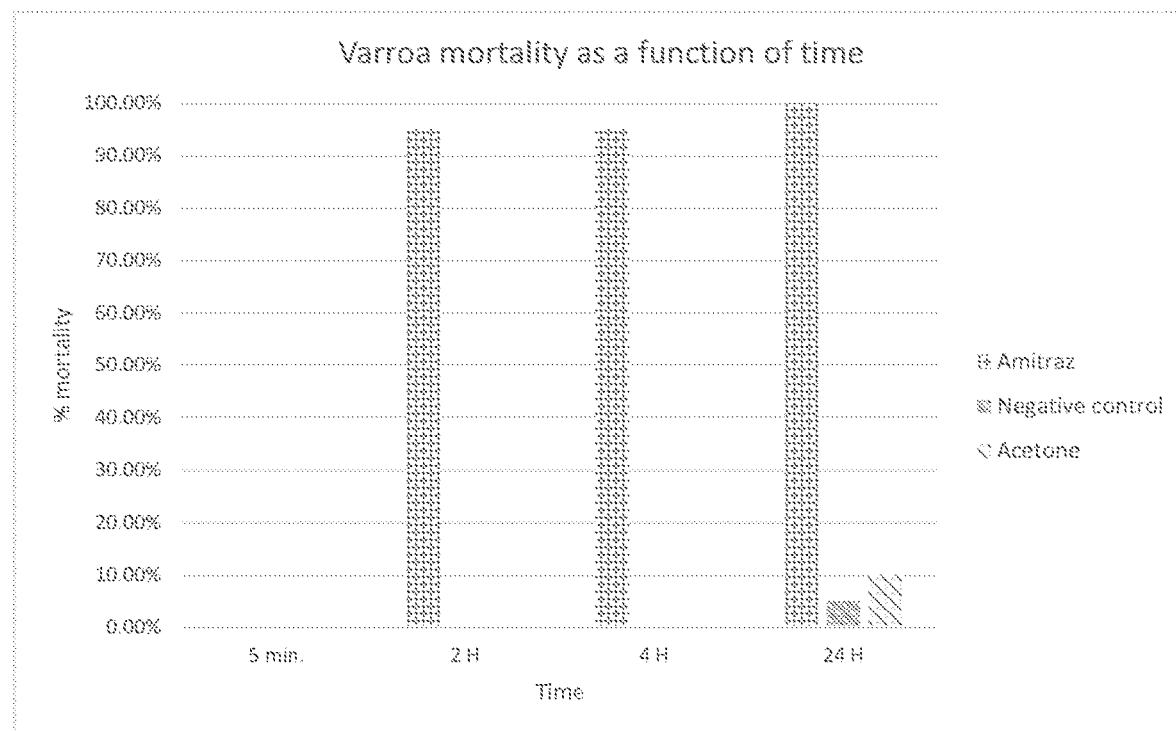

[Fig. 3A]
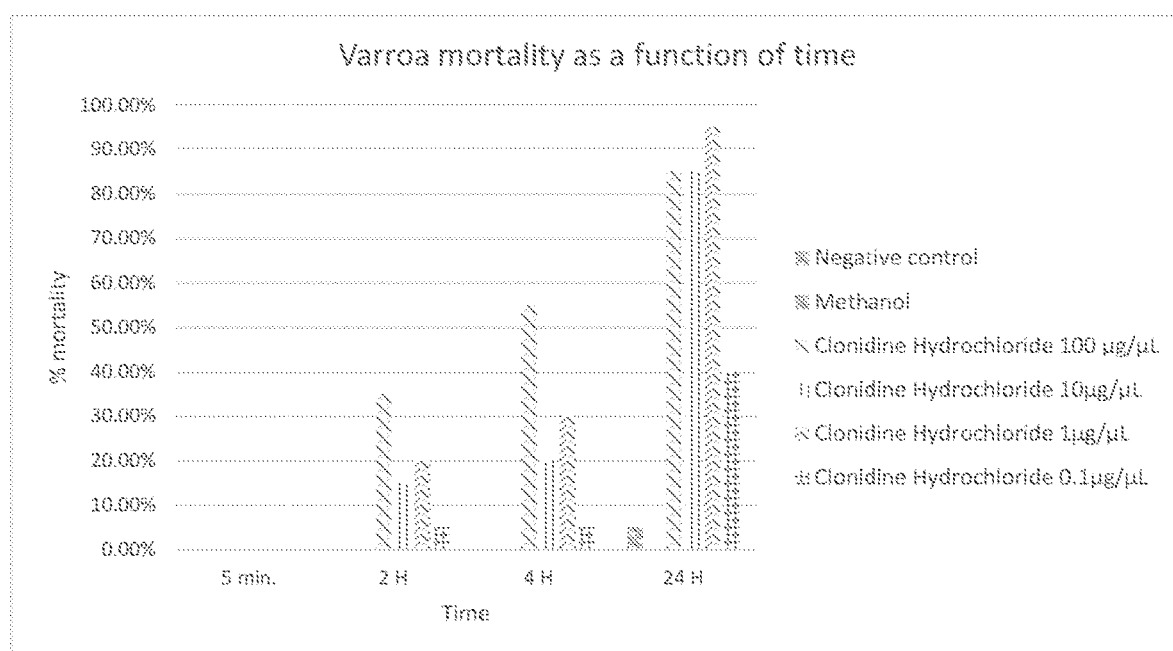

[Fig. 3B]
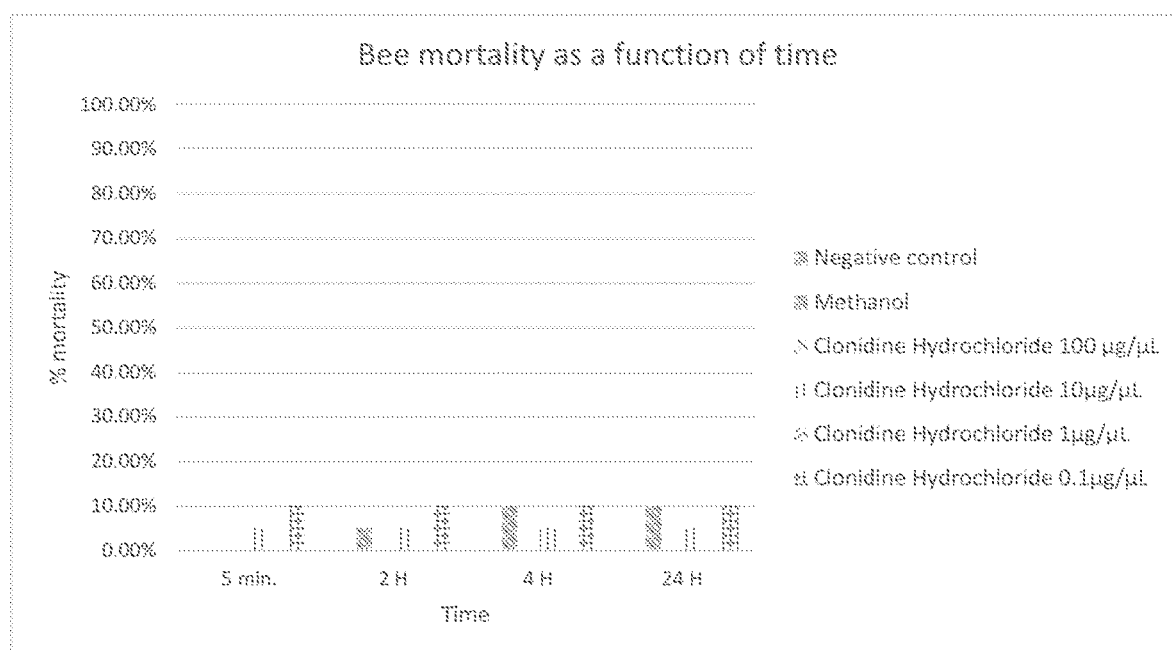

[Fig. 4A]
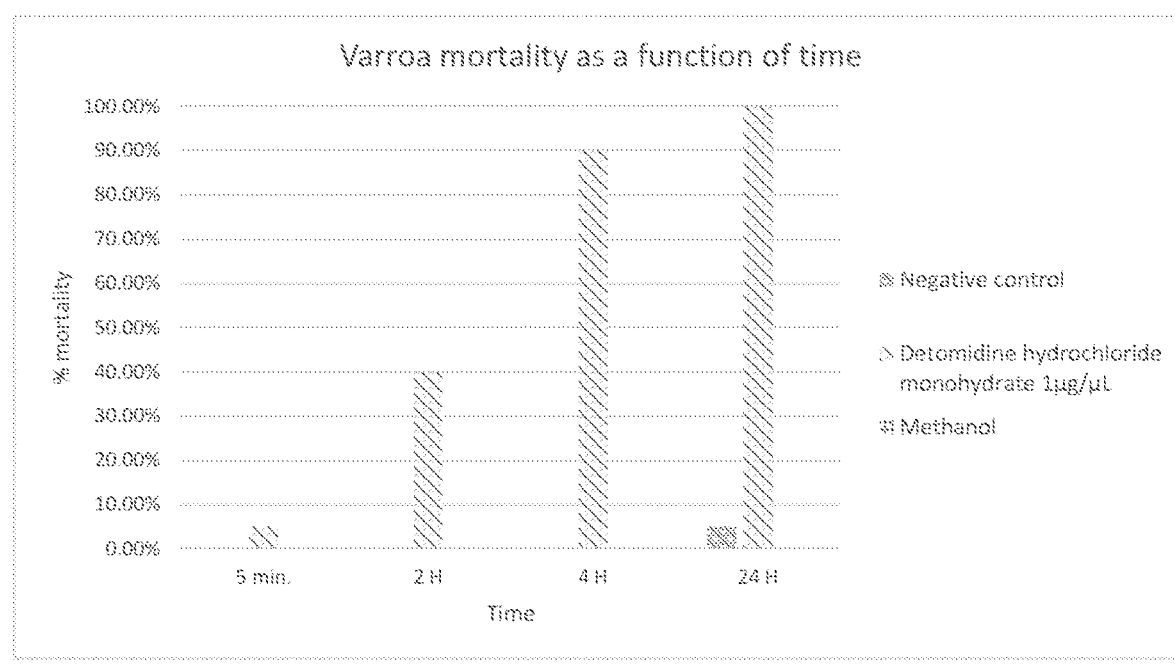

[Fig. 4B]
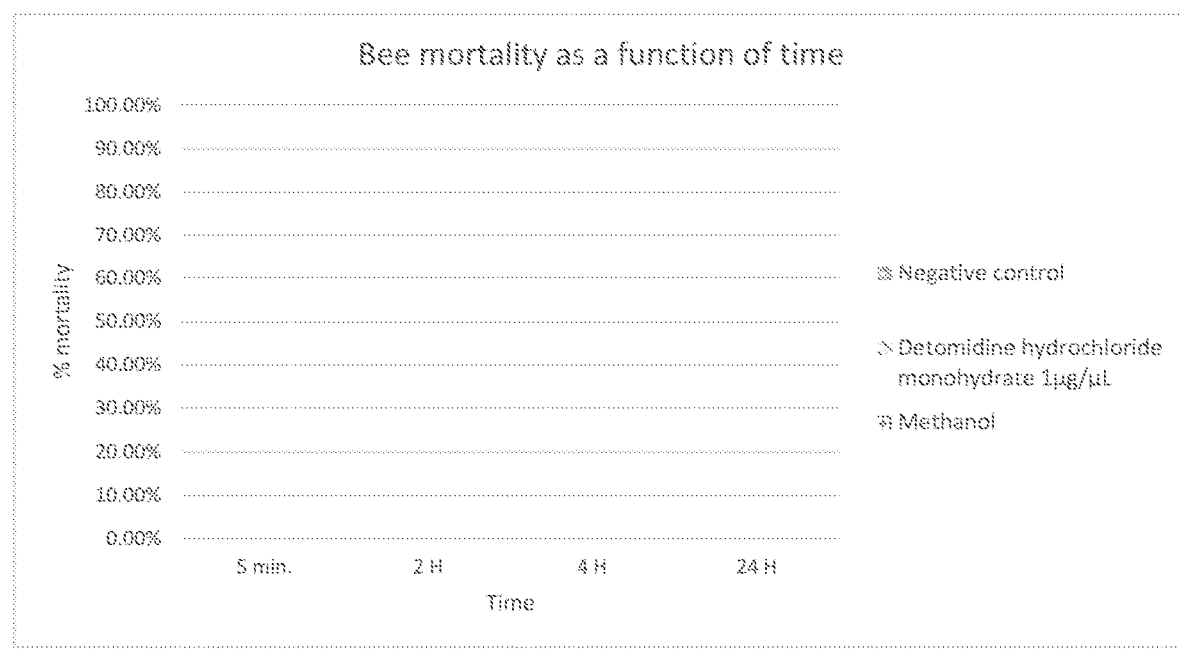

[Fig. 5A]
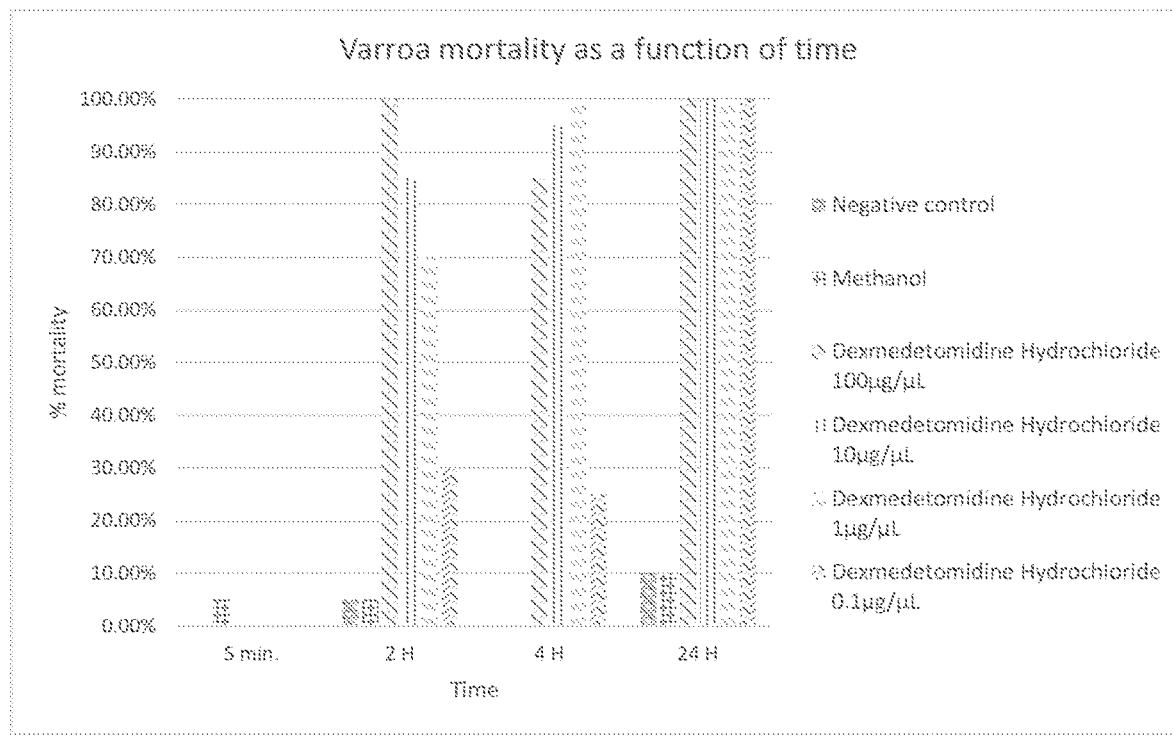

[Fig. 5B]
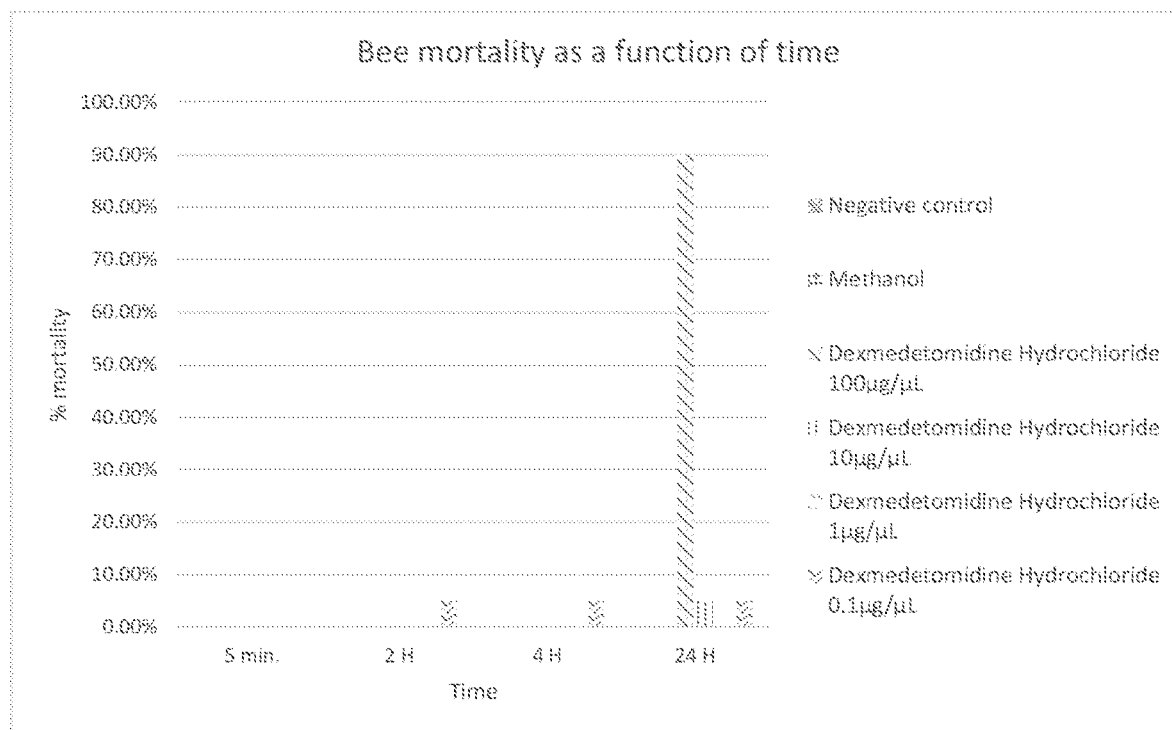

[Fig. 6A]
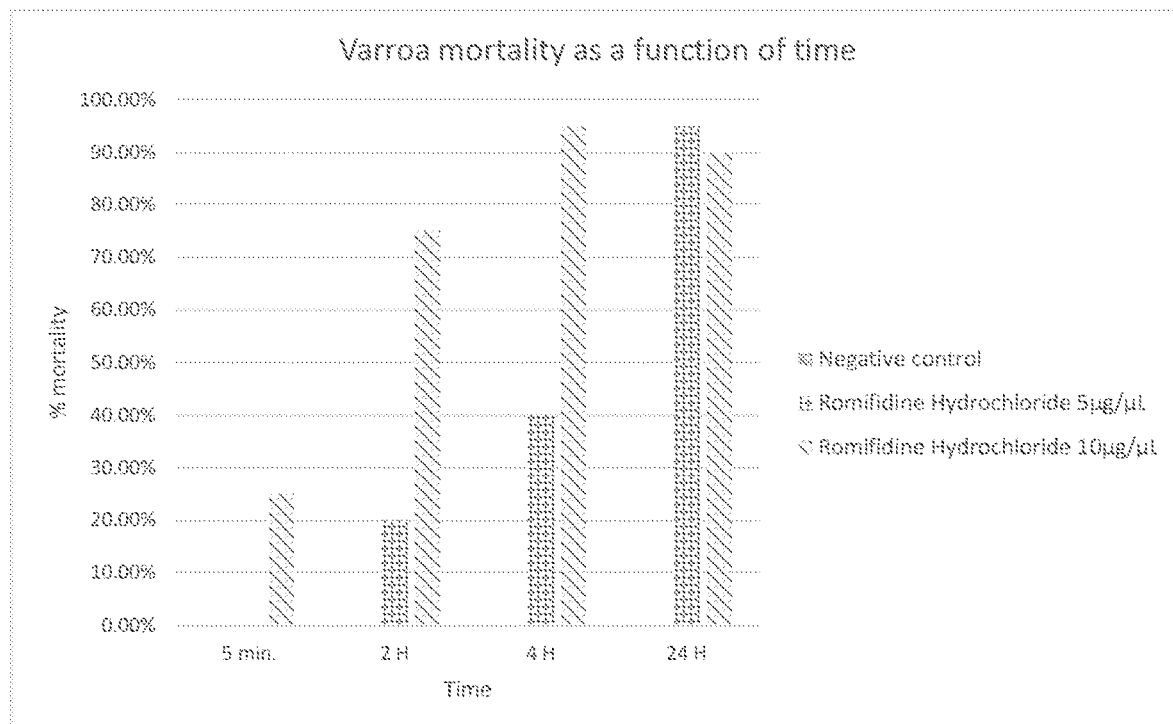

[Fig. 6B]
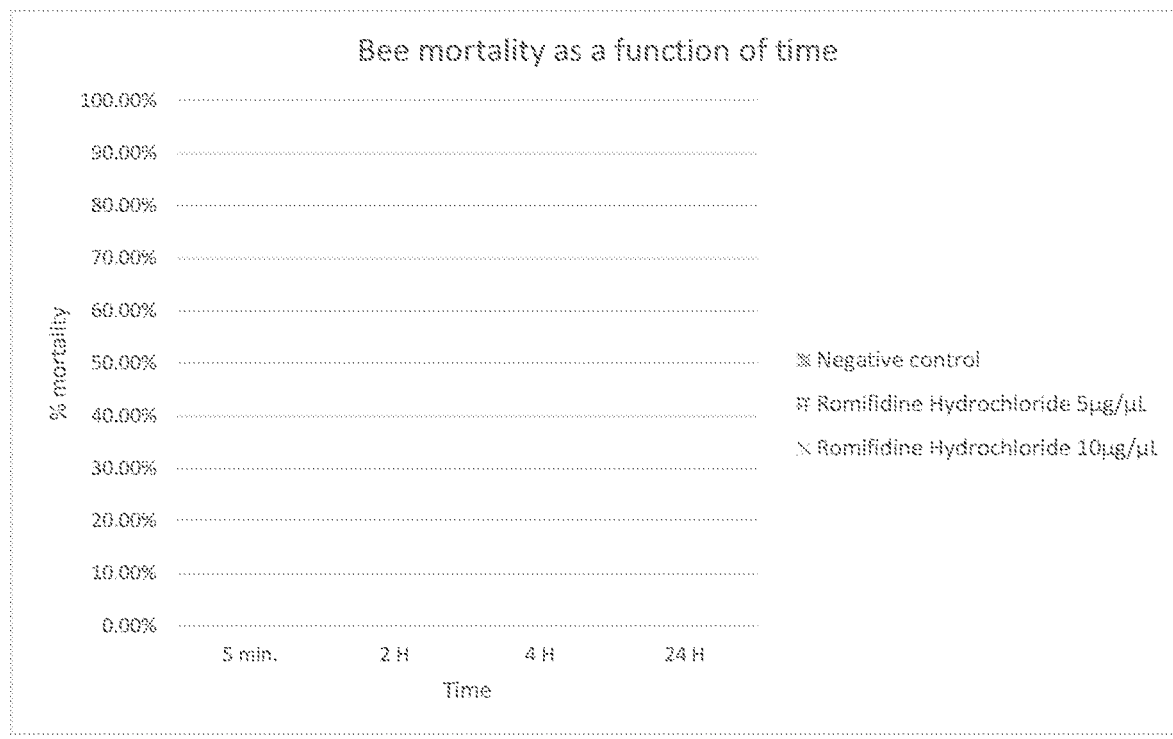

[Fig. 7A]
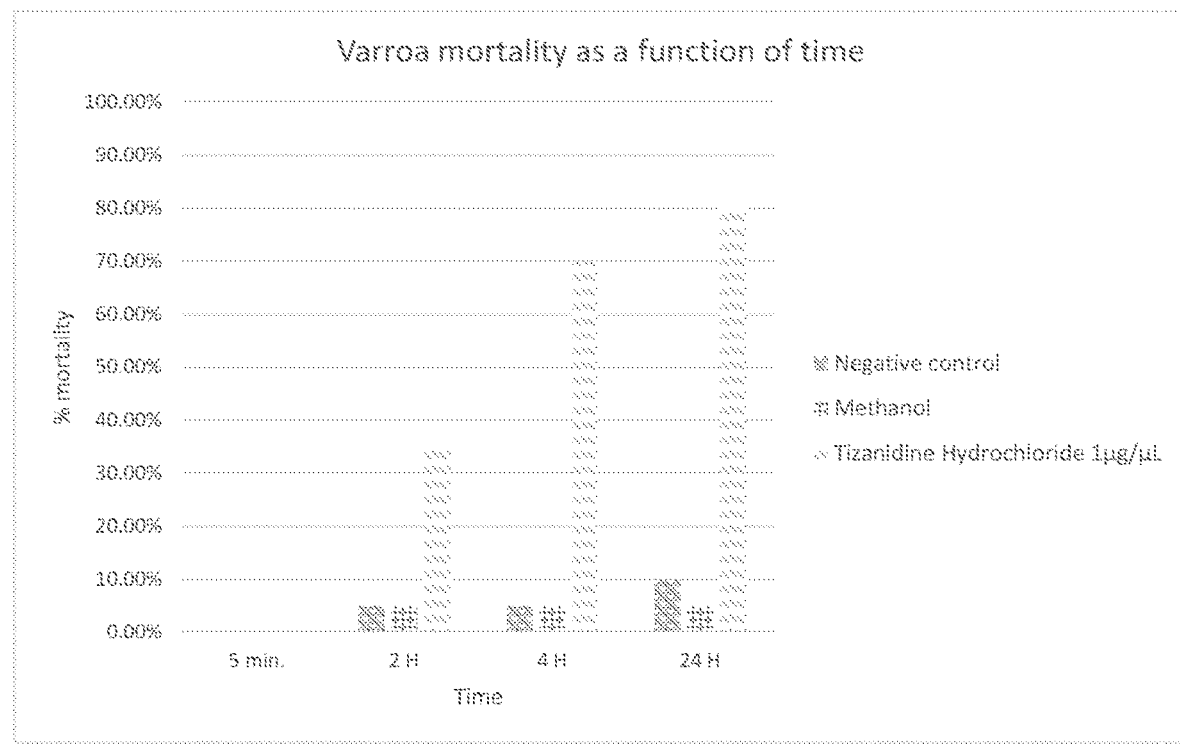

[Fig. 7B]
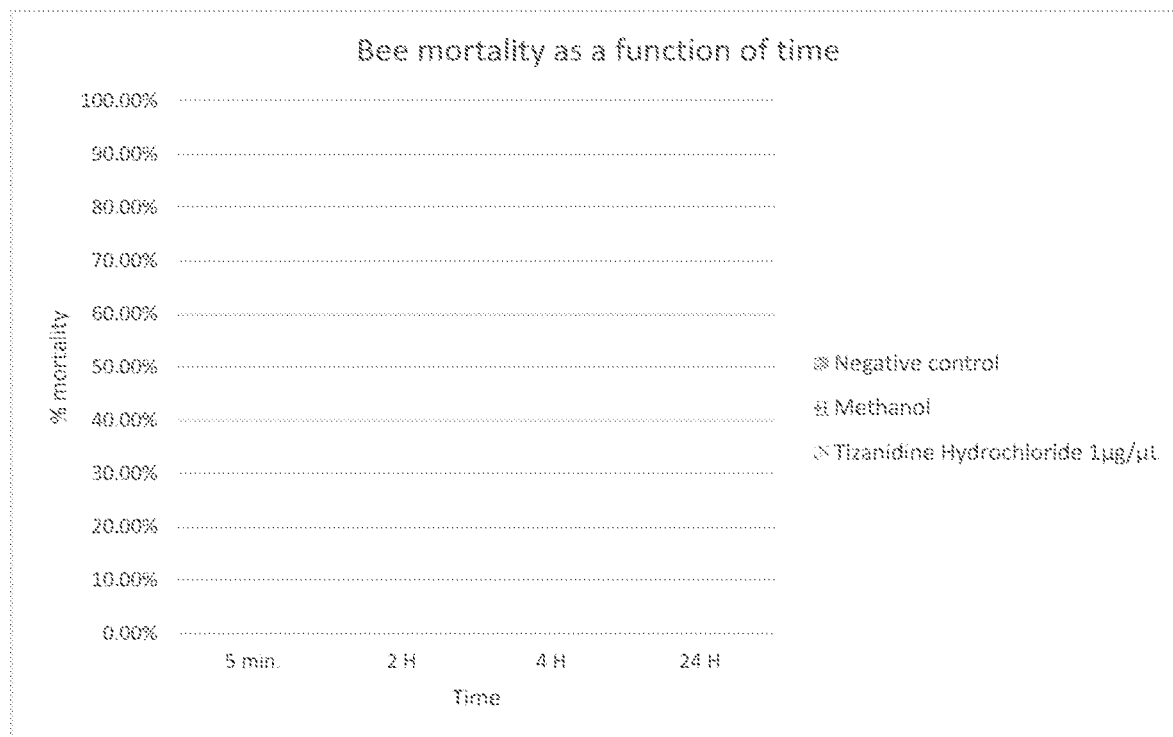

[Fig. 8A]
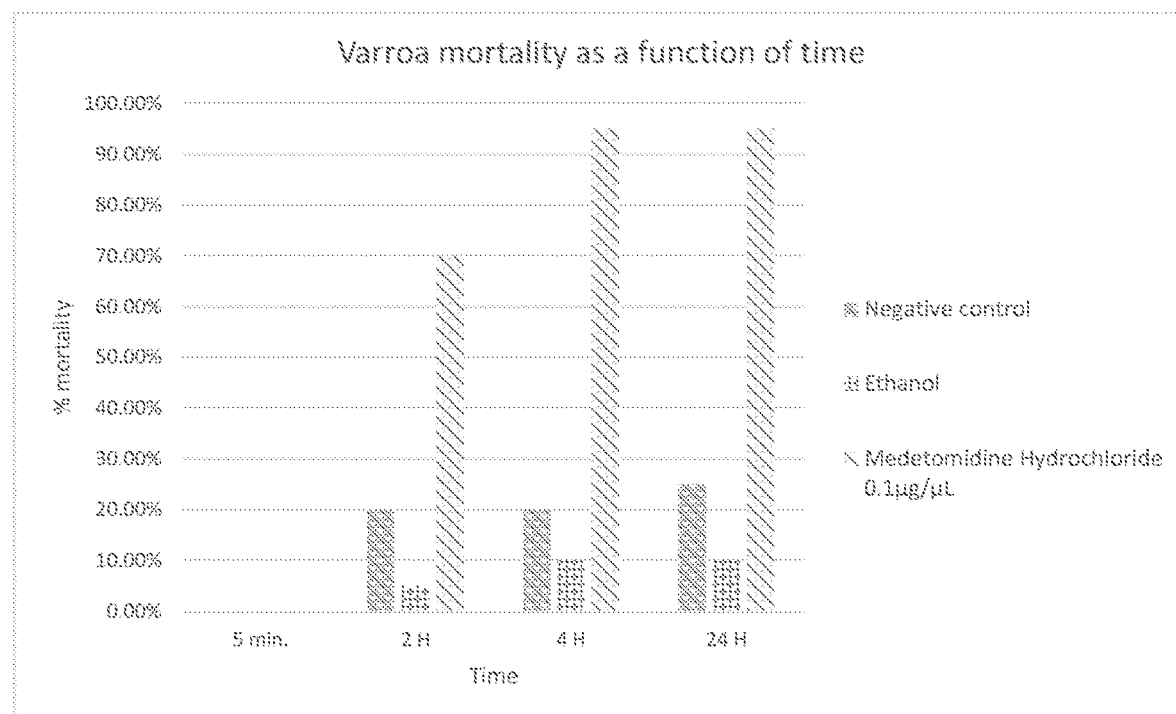

[Fig. 8B]
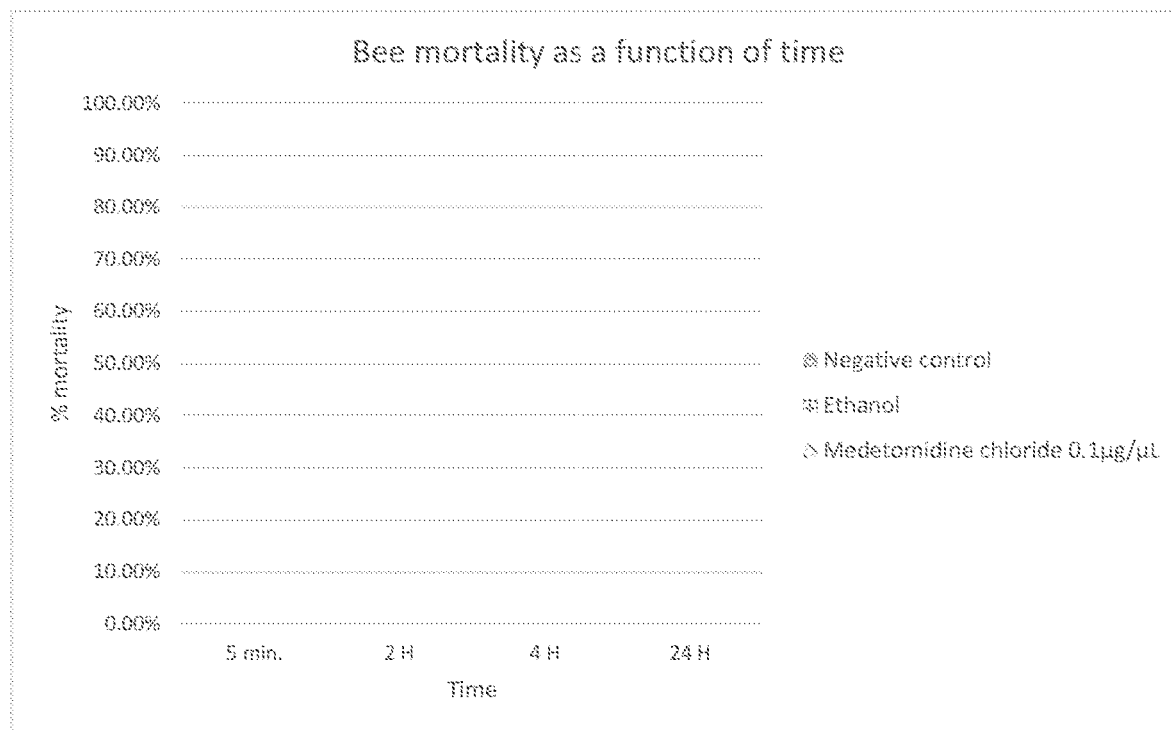

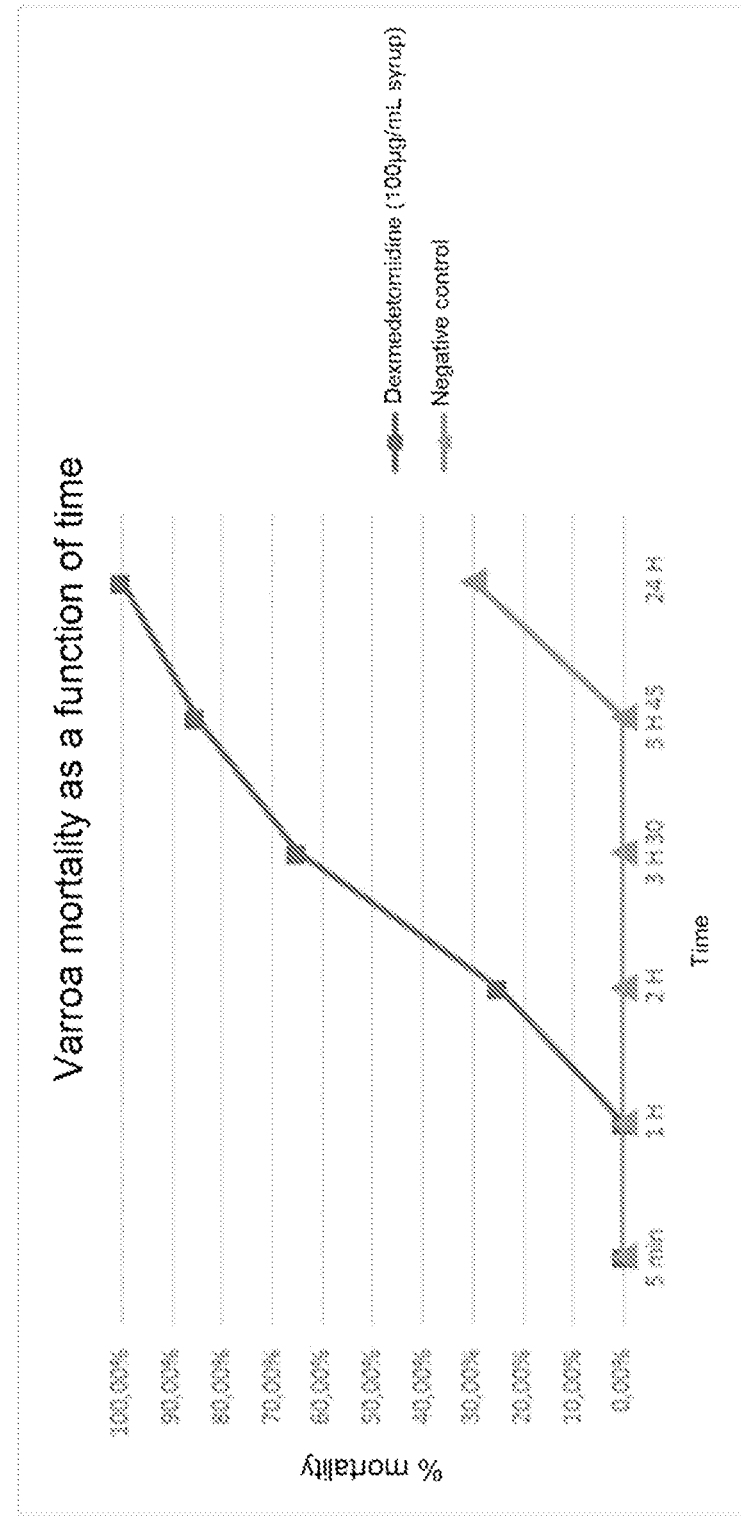

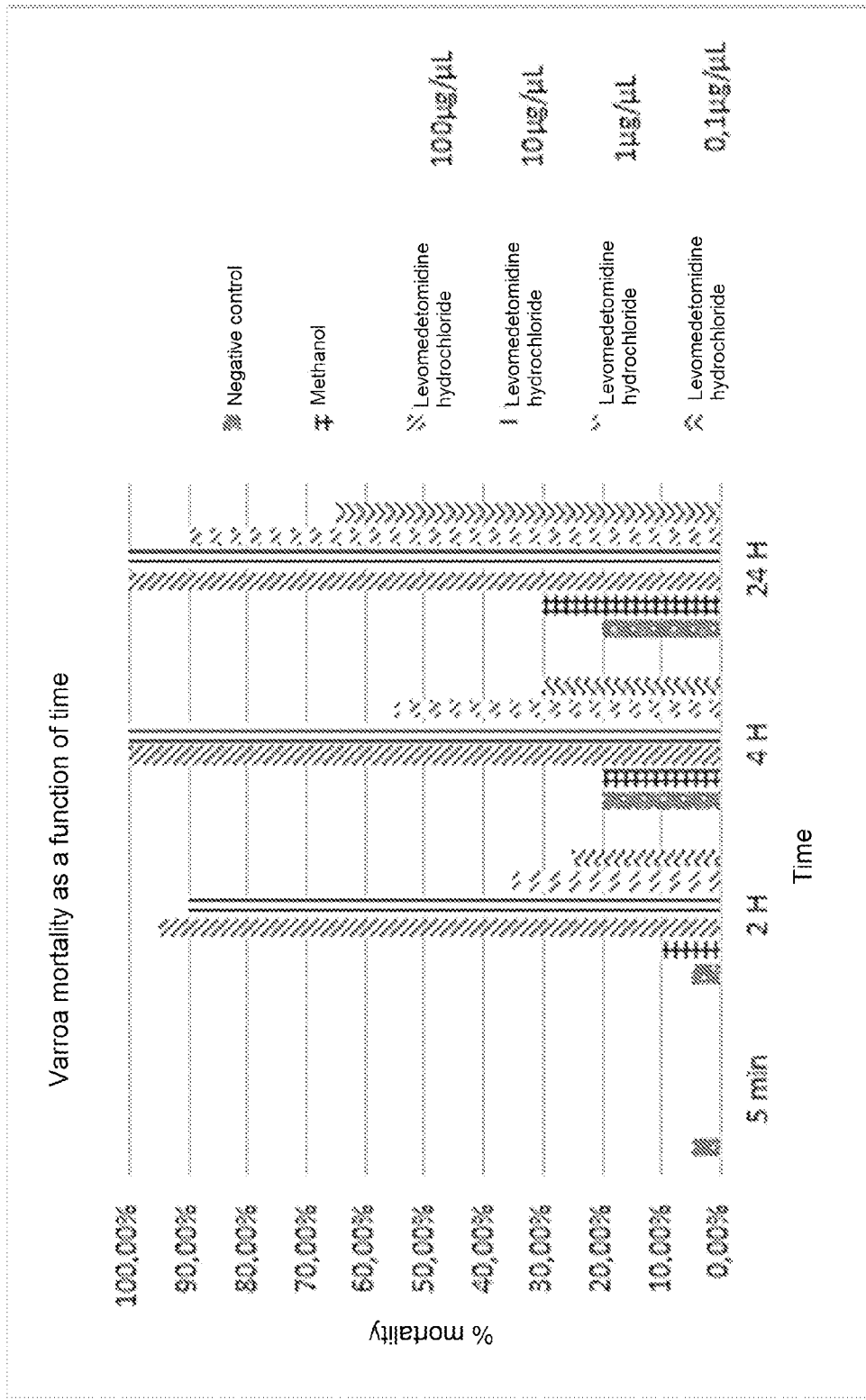
[Fig. 10A]

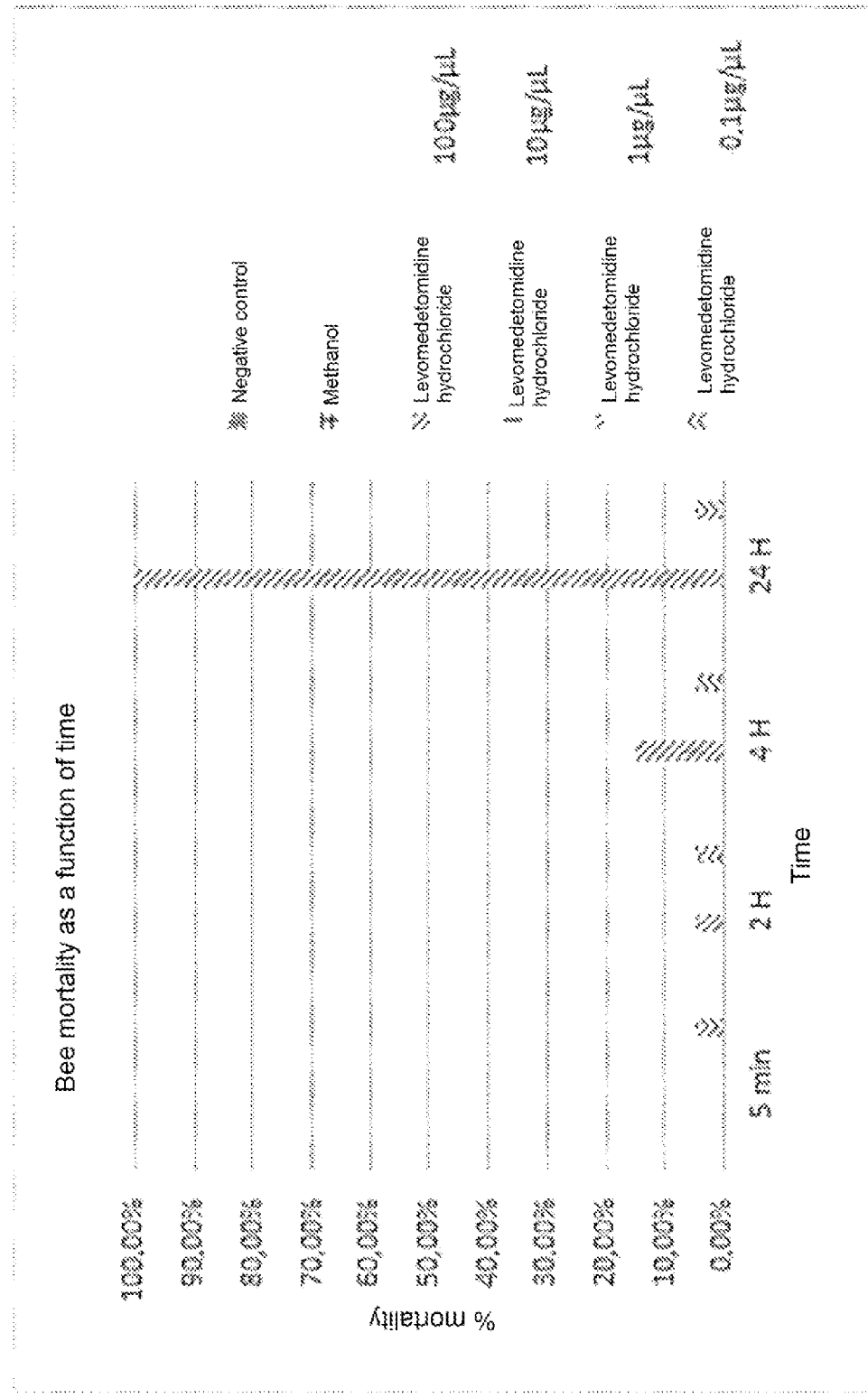
[Fig. 10B]

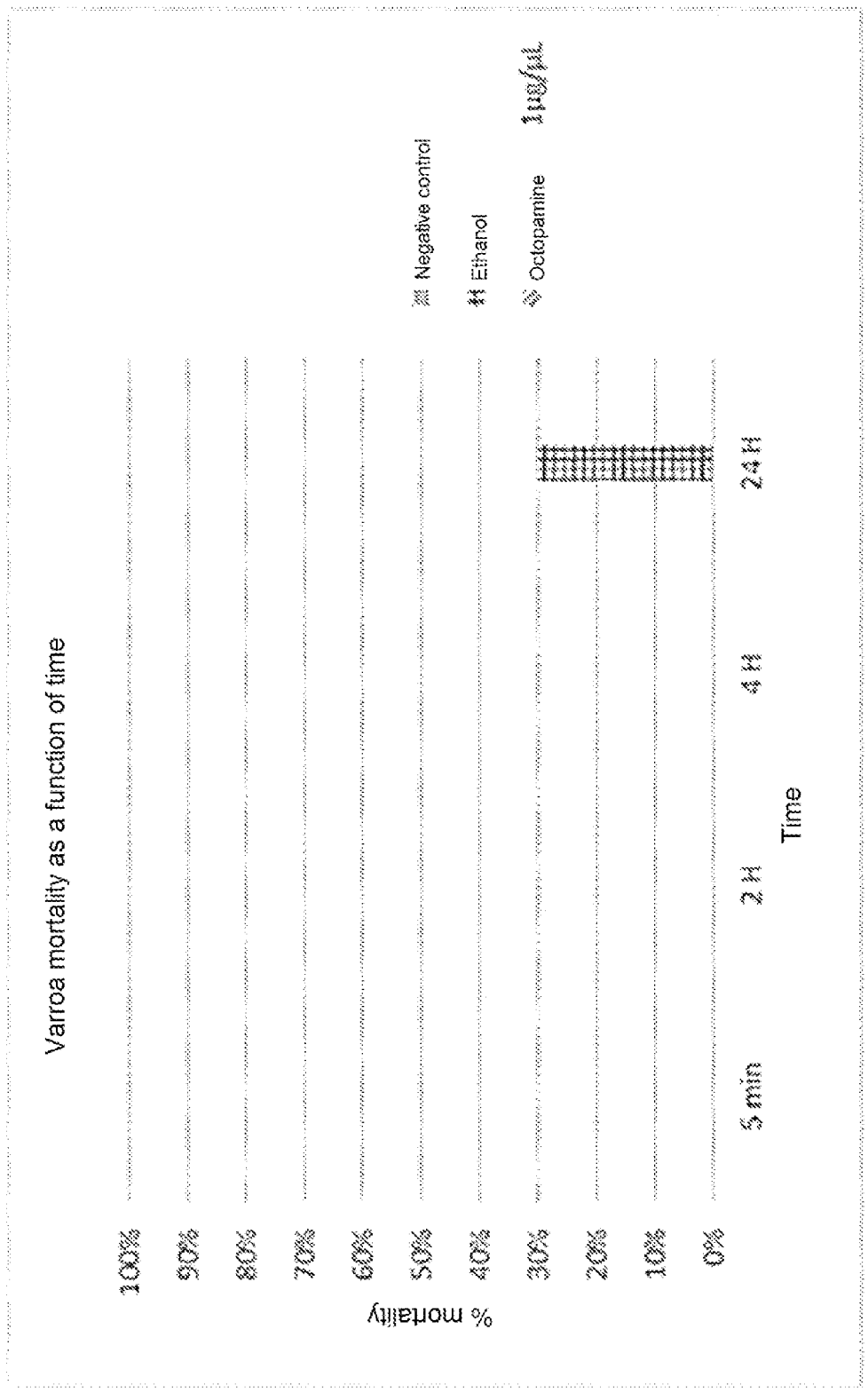
[Fig. 11A]

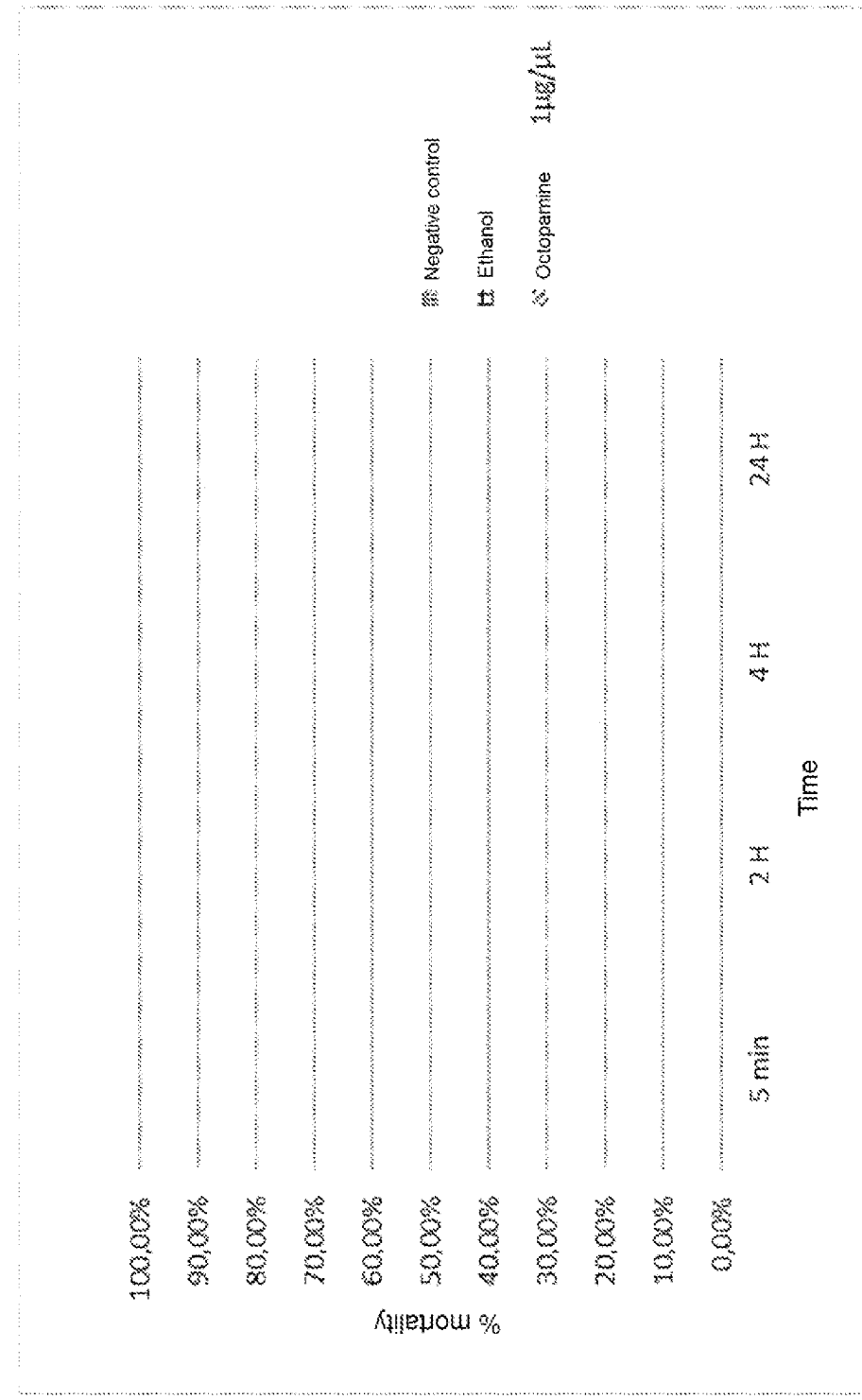
[Fig. 11B]

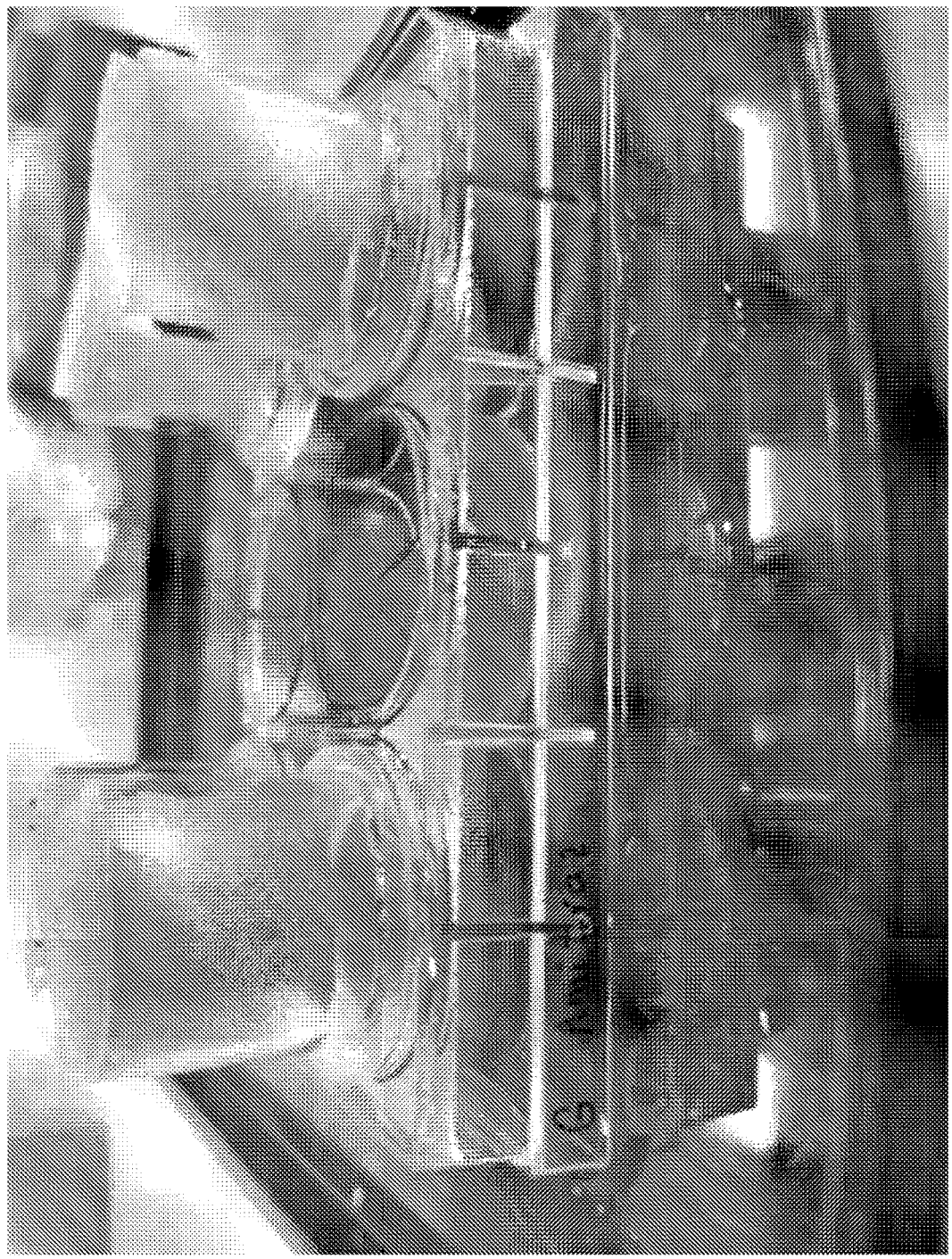
[Fig. 12]

MITE INFESTATION TREATMENT

CROSS REFERENCE TO RELATED APPLICATIONS

This application is a U.S. National Stage Application of PCT/FR2020/052402 filed 11 Dec. 2020, which claims priority to International Application No. PCT/FR2019/053064 filed on 13 Dec. 2019, the entire disclosures of which are hereby incorporated by reference in their entireties.

TECHNICAL FIELD

The invention relates to the use of an α-2-adrenergic agonist compound as an acaricide as well as a method for reducing or preventing *Varroa* mite infestation in a hive which consists in exposing a mite to an α-2-adrenergic agonist compound.

PRIOR ART

Most animals can be infested with mites. This is the case for example of domestic animals such as dogs, cats, horses but also farm animals such as bees, cattle, sheep, poultry. Beyond the inconvenience caused to animals, mites can weaken the animal, transmit diseases or even cause the death of the animal.

Colony Collapse Disorder (CCD) is the name given to the phenomenon of abnormal and recurrent mortality observed since the 1990s in honey bee colonies around the world. Several explanations for this phenomenon have already been put forward, in particular the increase in parasitic diseases, and more particularly those caused by *Varroa* and varroosis mites. This mite parasitizes bees and weakens colonies by reducing their immune defenses and their physiological state, and can be a vector of viruses. The treatment of this parasite is a major issue for the survival of colonies and therefore the maintenance of pollination as well as the conservation of their productivity.

Today, everyone is aware of the impact of *Varroa* mites on colonies. Many techniques are used to determine colony infestation. They are based in particular on the calculation of the percentage of bee infestation by removing the *Varroa* mites attached to bees (percentage of phoretic *Varroa* mites per 100 bees) using a detergent, a liquid comprising alcohol, $CO_2$ or icing sugar then counting the detached *Varroa* mites [1]. Several more or less sophisticated devices have been described in the literature for removing *Varroa* mites from bees, in particular the device described in Canadian patent application n° 2,943,917 or the device described in Community model n° 003419415-0001. The percentage of infestation corresponds to the number of *Varroa* mites found on 100 adult bees. Depending on the time of year, it is possible to generate indicators:

Between 0 and 2% infestation, the colony is doing well.
At about 5% infestation, there is an effect on population dynamics and on honey production (about 25% less harvest during a honey flow, [2]).
At about 10% or more infestation, the colony will die more or less quickly and will not survive the winter.

For the colonies to have a maximum of 5% infestation at the end of the season, it is very important that the infestation in the spring be less than 1%.

Despite the research and experimentation efforts carried out for more than thirty years, the therapeutic arsenal available to fight against this mite is reduced to a few products and beekeepers feel helpless in the face of this scourge. However, the latter have some treatments to intervene to protect their colonies but few compounds are really authorized to treat varroosis.

In France, there are to date 6 active compounds for use against Varroasis with variable efficiency.

The treatments are currently divided into two categories: chemical and biological compounds, but they are also differentiated by their duration of treatment (long or short).

Long treatments are generally done at the end of the apiculture season (mid-August) before the fatal *Varroa* mite peak in August/September and can also be applied in spring in addition to limit summer infestation as much as possible. Short treatments must be carried out in the absence of brood (outside the summer season) and are used in addition to a long treatment to increase the efficiency of the latter.

There are three chemical compounds derived from synthetic molecules: amitraz, tau-fluvalinate and flumethrin. Amitraz is a compound of the formula:

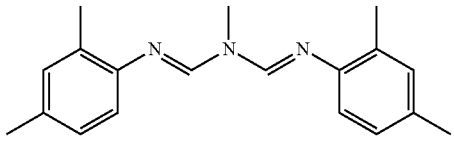

There are three natural compounds used in organic apiculture: thymol, oxalic acid and formic acid.

Among them, some unfortunately see their efficiency decrease because of the increasing resistance of *Varroa* mites to certain compounds used. This is particularly the case for the tau-fluvalinate and flumethrin compounds. In addition, the reduced number of treatments available does not allow sufficient alternation in the context of effective health management.

These compounds have also shown their efficiency in treating infestations by mites in animals other than bees.

Research is therefore still necessary to identify new molecules that are effective against mites and without risk for the treated animals and for humans, in particular for combating *Varroa* mites and without risk both for bee colonies and for the environment and the beekeeper, without degrading the quality of the honey for human consumption.

SUMMARY OF THE INVENTION

According to a first aspect, the invention relates to the use of a compound of formula (I), a salt thereof or a composition containing same as an acaricide, said formula (I) is:

wherein:
A is selected from the group (II) or (III):

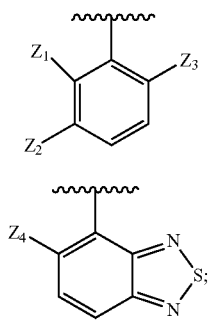

X is NH, CH$_2$ or CH—CH$_3$;
Y is a 5-bonded heterocycle comprising at least one nitrogen atom;
Z$_1$ is a halogen, H or CH$_3$;
Z$_2$ is a halogen, H or CH$_3$;
Z$_3$ is a halogen, H or CH$_3$;
Z$_4$ is a halogen, H or CH$_3$.

According to a second aspect, the invention relates to a method for reducing or preventing an infestation by a mite, comprising exposing the mite to a compound of formula (I), a salt thereof or a composition containing same, said formula (I) is:

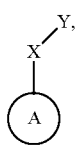

wherein:
A is selected from the group (II) or (III):

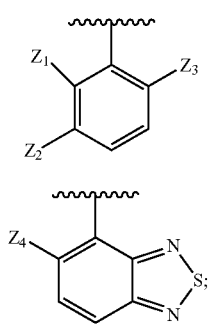

X is NH, CH$_2$ or CH—CH$_3$;
Y is a 5-bonded heterocycle comprising at least one nitrogen atom;
Z$_1$ is a halogen, H or CH$_3$;
Z$_2$ is a halogen, H or CH$_3$;
Z$_3$ is a halogen, H or CH$_3$;
Z$_4$ is a halogen, H or CH$_3$.

According to a third aspect, the invention relates to a composition adapted for use as a Varroacid in bees, said composition comprising a compound of formula (I) or a salt thereof, one or more attractant(s) for bees, and one or more polymer(s) selected from a plastic material, a rubber, an adhesive, a resin and polyholoside fibers, said formula (I) is:

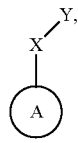

wherein:
A is selected from the group (II) or (III):

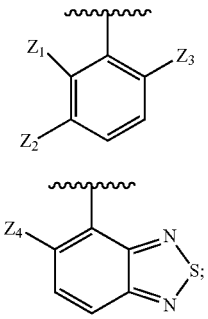

X is NH, CH$_2$ or CH—CH$_3$;
Y is a 5-bonded heterocycle comprising at least one nitrogen atom;
Z$_1$ is a halogen, H or CH$_3$;
Z$_2$ is a halogen, H or CH$_3$;
Z$_3$ is a halogen, H or CH$_3$;
Z$_4$ is a halogen, H or CH$_3$.

According to a fourth aspect, the invention relates to a strap, preferably adapted for use in apiculture, comprising (i) a compound of formula (I), a salt thereof, a composition containing same or (ii) a composition according to the invention,
said formula (I) is:

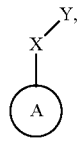

wherein:
A is selected from the group (II) or (III):

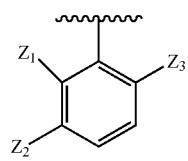

-continued

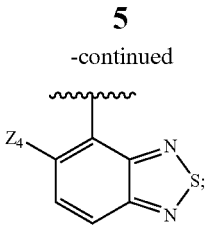
(III)

X is NH, CH$_2$ or CH—CH$_3$;
Y is a 5-bonded heterocycle comprising at least one nitrogen atom;
Z$_1$ is a halogen, H or CH$_3$;
Z$_2$ is a halogen, H or CH$_3$;
Z$_3$ is a halogen, H or CH$_3$;
Z$_4$ is a halogen, H or CH$_3$.

According to a fifth aspect, the invention relates to a hive comprising (i) a compound of formula (I), a salt thereof, a composition containing same, (ii) a composition according to the invention, or (iii) a strap according to the invention said formula (I) is:

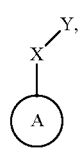
(I)

wherein:
A is selected from the group (II) or (III):

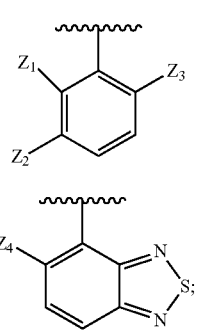
(II)

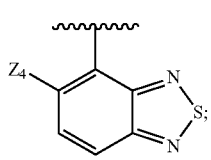
(III)

X is NH, CH$_2$ or CH—CH$_3$;
Y is a 5-bonded heterocycle comprising at least one nitrogen atom;
Z$_1$ is a halogen, H or CH$_3$;
Z$_2$ is a halogen, H or CH$_3$;
Z$_3$ is a halogen, H or CH$_3$;
Z$_4$ is a halogen, H or CH$_3$.

DETAILED DESCRIPTION

Definition of the Compound of Formula (I)

The compound of formula (I) is an α-2-adrenergic agonist. Its formula is:

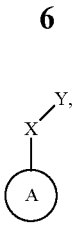
(I)

wherein:
A is selected from the group (II) or (III):

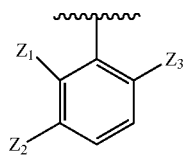
(II)

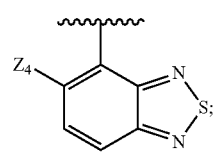
(III)

X is NH, CH$_2$ or CH—CH$_3$;
Y is a 5-bonded heterocycle comprising at least one nitrogen atom;
Z$_1$ is a halogen, H or CH$_3$;
Z$_2$ is a halogen, H or CH$_3$;
Z$_3$ is a halogen, H or CH$_3$;
Z$_4$ is a halogen, H or CH$_3$.
Advantageously, Y is the following group (IV) or (V):

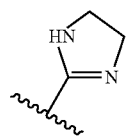
(IV)

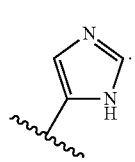
(V)

Advantageously, the compound of formula (I) is:

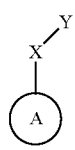
(I)

wherein:
A is the group (II), X is NH, Y is the group (IV), Z$_1$ is a halogen, Z$_2$ is H and Z$_3$ is a halogen,
A is the group (II), X is CH$_2$ or CH—CH$_3$, Y is the group (V), Z$_1$ is CH$_3$, Z$_2$ is CH$_3$ and Z$_3$ is H, or
A is the group (III), X is NH, Y is the group (IV) and Z$_4$ is a halogen.

Advantageously, the allogen is selected from F, Cl or Br.

In a particular embodiment, the compound of formula (I) is selected from detomidine (CAS number: 76631-46-4), medetomidine (D) (that is to say dexmedetomidine—CAS number: 113775-47-6), medetomidine (L) (that is to say levomedetomidine—CAS number: 119717-21-4), romifidine (CAS number: 65896-16-4), clonidine (CAS number: 4205-90-7), tizanidine (CAS number: 51322-75-9) or a mixture of two or more of these compounds. It may for example be a racemic mixture, for example the racemate of medetomidine (CAS number: 86347-14-0).

Detomidine is also known by the chemical name 4-[(2,3-dimethylphenyl)-methyl]-3H-imidazole. It has the following formula:

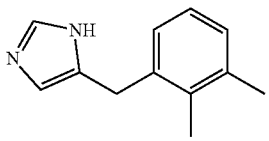

Dexmedetomidine corresponds to the dextrorotatory enantiomer of medetomidine. Dexmedetomidine is also known by the chemical name (S)-4-[1-(2,3-dimethylphenyl)-ethyl]-1H-imidazole. It has the following formula:

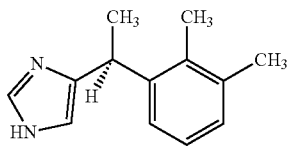

Clonidine is also known by the chemical name of N-(2,6-dichlorophenyl)-4,5-dihydro-1H-imidazol-2-amine. It has the following formula:

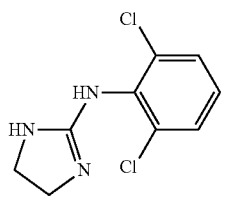 [SMILES: Clc1cccc(Cl)c1NC1=NCCN1]

Romifidine is also known by the chemical name of N-(2-bromo-6-fluorophenyl)-4,5-dihydro-1H-imidazol-2-amine. It has the following formula:

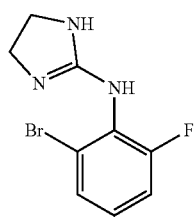 [SMILES: Fc1cccc(Br)c1NC1=NCCN1]

Tizanidine is also known by the chemical name 4-Chloro-N-(4,5-dihydro-1H-imidazol-2-yl)-8-thia-7,9-diazabicyclo,nona-2,4,6,9-tetraen-5-amine. It has the following formula:

In a particularly preferred embodiment, the compound of formula (I) is dexmedetomidine. Dexmedetomidine is a compound of particular interest for use in apiculture because the applicant has shown that this compound has Varroacid properties without toxicity for bees.

The compound of formula (I) according to the invention can also be in the form of a salt. The term "salt" means an ionic compound composed of cations and anions forming a neutral product with no net charge. The person skilled in the art will know how to choose a salt which is suitable for implementing the invention, namely a salt which is non-toxic for the handler and/or for the bees and/or for the consumption of honey. The salt can be selected from the following salts: hydrochloride, acetate, adipate, aspartate, benzoate, besylate, bicarbonate/carbonate, bisulphate/sulphate, borate, camsylate, citrate, cyclamate, edisylate, esylate, formate, fumarate, gluceptate, gluconate, glucuronate, hexafluorophosphate, hibenzate, hydrochloride/chloride, hydrobromide/bromide, hydroiodide/iodide, isethionate, lactate, malate, maleate, malonate, mesylate, methylsulphate, naphthylate, 2-napsylate, nicotinate, nitrate, orotate, oxalate, palmitate, pamoate, phosphate/hydrogen phosphate/dihydrogen phosphate, pyroglutamate, saccharate, stearate, succinate, tannate, tartrate, tosylate, trifluoroacetate, xinofoate, aluminum, arginine, benzathine, calcium, choline, diethylamine, diolamine, glycine, lysine, magnesium, meglumine, olamine, potassium, sodium, tromethamine and zinc. For example, the salts known to be pharmaceutically acceptable are suitable for the implementation of the invention, and are in particular referenced in the Handbook of Pharmaceutical Salts: Properties, Selection, and Use by Stahl and Wermuth (Wiley-VCH, 2002).

A salt particularly suitable for implementing the invention is a salt of a compound selected from detomidine, medetomidine (D) (that is to say dexmedetomidine), medetomidine (L) (that is to say levomedetomidine), romifidine, clonidine, tizanidine or a mixture of two or more of these compounds. Advantageously, the salt is the hydrochloride. It may be, for example, medetomidine (L) hydrochloride (that is to say levomedetomidine hydrochloride—CAS number: 190000-46-5) and/or medetomidine (D) hydrochloride (e.g. dexmedetomidine hydrochloride—CAS number: 145108-58-3 or medetomidine hydrochloride—CAS number: 86347-15-1), clonidine hydrochloride (CAS number: 4205-91-8), tizanidine hydrochloride (CAS number: 64461-82-1), or detomidine hydrochloride (CAS number: 90038-00-9).

In the context of the present invention, several compounds of formula (I) can be associated with each other.

A salt particularly suitable for the implementation of the invention in the field of apiculture is dexmedetomidine hydrochloride because the applicant has shown that this compound has Varroacid properties without toxicity for bees.

Definitions

The term "acaricide" denotes a compound having the property of killing mites. For example, the compound may have the property of killing mites by paralysis. In a particular embodiment of the present invention, the acaricide can be a "Varroacid", that is to say a compound having the property of killing *Varroa* mites.

In the context of the present invention, the mite can be:
- a mite of the metastigmata suborder (ticks), in particular of the Ixodidae family, such as *Ixodes ricinus, Ixodes scapularis, Rhipicephalus sanguineus* and *Boophilus microplus* (cattle tick), *Dermacentor vanabilis, Amblyomma ameficanum;*
- a mite of the Mesostigmata suborder, in particular of the Dermanyssidae family, such as *Dermanyssus gallinae* (poultry louse) or of the Varroidae family, such as *Varroa;*
- a mite from the Astigmata suborder ("galls"), in particular from the Sarcoptidae family, such as *Sarcoptes scabiei* and *Notoedres cati* or from the Psoroptidae family, such as *Psoroptes ovis, Chorioptes bovis* and *Otodectes cynotis,* or
- a mite of the Prostigmata suborder, in particular of the Demodicidae family, such as *Demodex bovis* and *Demodex canis* or of the Cheyletiellidae family, such as *Cheyletiella yasguri.*

In this particular embodiment of the present invention, the mite is *Varroa* mite. The term "*Varroa*" refers to an ectoparasitic bee mite. It parasitizes all stages of its development and affects the health of the bee then that of the bee colony, especially in a hive. In the context of the present invention, *Varroa* is preferably *Varroa destructor.*

The term "animal" in the context of the present invention denotes, for example, dogs, cats, horses, poultry, cattle, sheep, bees.

The term "bee" designates an insect of the order Hymenoptera and of the *Apis* genus. There are 4 species of bees: *Apis dorsata, Apis florea, Apis cerana* and *Apis mellifera.* In a particular embodiment of the invention, the bee is *Apis mellifera.*

The term "hive" designates a structure housing a colony of bees. The interior of the hive is made up of combs formed by hexagonal cells of beeswax. Bees use these cells for food storage (honey and pollen), and for population renewal (eggs, larvae and pupae). In apiculture, the hive is the living unit built by the beekeeper to accommodate a colony of bees. This is usually a wooden or plastic box.

The term "strap" designates a strip made by cutting or braiding a flexible material. The flexible material can for example be a plastic material, a rubber, a fabric, a resin or polyholoside fibers. The strap can come in different shapes. It can be, for example, a cat collar, a dog collar or a strap used in apiculture. Preferably, the strap is a strap adapted for use in apiculture, that is to say a non-circular strap, preferably a flat strap, having a size, a rigidity and a shape adapted so that the strap can be slip between the frames of a hive.

The present invention stems from the advantages demonstrated by the inventors of the acaricidal effect of a compound of formula (I).

Use and Method

According to a first aspect, the invention relates to the use of a compound of formula (I), a salt thereof or a composition containing same as an acaricide, said formula (I) is:

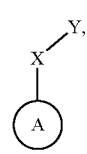

(I)

wherein:
A is selected from the group (II) or (III):

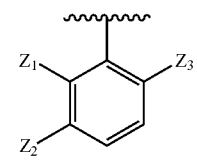

(II)

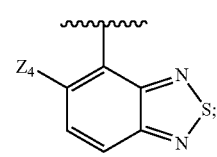

(III)

X is NH, $CH_2$ or $CH-CH_3$;
Y is a 5-bonded heterocycle comprising at least one nitrogen atom;
$Z_1$ is a halogen, H or $CH_3$;
$Z_2$ is a halogen, H or $CH_3$;
$Z_3$ is a halogen, H or $CH_3$;
$Z_4$ is a halogen, H or $CH_3$.

Advantageously, the compound of formula (I) is used:
to reduce or prevent an infestation by a mite,
to reduce or prevent an infestation by a mite in an animal, for example the animal is a cat, a dog, a horse, a poultry, cattle, a sheep or a bee,
to reduce or prevent an infestation by a mite in a hive, preferably the mite is *Varroa* mite.

According to a second aspect, the invention relates to a method for reducing or preventing an infestation by a mite, comprising exposing *Varroa* mites to a compound of formula (I), a salt thereof or a composition containing same, said formula (I) is:

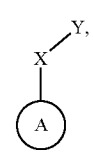

(I)

wherein:
A is selected from the group (II) or (III):

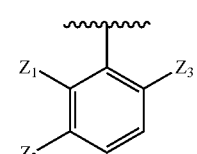

(II)

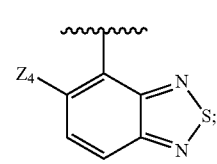

(III)

X is NH, $CH_2$ or $CH-CH_3$;
Y is a 5-bonded heterocycle comprising at least one nitrogen atom;

$Z_1$ is a halogen, H or $CH_3$;
$Z_2$ is a halogen, H or $CH_3$;
$Z_3$ is a halogen, H or $CH_3$;
$Z_4$ is a halogen, H or $CH_3$.

According to the second aspect of the invention, the infestation by a mite can be:
- an infestation by a mite in an animal, for example the animal is a cat, a dog, a horse, a poultry, cattle, a sheep or a bee,
- an infestation by a mite in a hive, preferably the mite is Varroa mite.

In the context of the present invention, the composition of the compound of formula (I) or the composition of the salt of the compound of formula (I) contains from 0.001 to 200 µg/µL of compound of formula (I) or salt thereof, preferably from 0.01 to 100 µg/µL, from 0.1 to 100 µg/µL, for example about 0.1 µg/µL, about 1 µg/µL, about 10 µg/µL, about 25 µg/µL, about 50 µg/µL, about 75 µg/µL or even about 100 µg/µL.

The compound of formula (I) or the salt thereof can be diluted in a solvent. The solvent can for example be acetonitrile, acetone, ethanol or methanol.

The compound of formula (I) or the salt thereof may be in the form of a composition. It may be a composition according to the invention, as defined below.

The compound of formula (I), the salt thereof or the composition containing same may be comprised in and/or on a strap. It may be a strap according to the invention, as defined below.

In a particular embodiment of the invention, the reduction in the mite infestation is a reduction of at least 25%, preferably of at least 50%, 55%, 60%, 65%, 70%, 75%, 80%, 85%, 90%, 95% or even 100% of the number of living mites attached to an animal. Such a reduction is advantageously obtained less than 24 hours (h) after the treatment, for example less than 12 hours, less than 6 hours or even less than 3 hours after the treatment, for example by implementing the test described in the example part. In real conditions, the reduction can be obtained after a few days or even a few weeks. The reduction in infestation can be measured easily, for example for infestation of bees by Varroa mites, by taking 100 bees from the hive and counting the number of Varroa mites attached to them. It is then easy to compare the number of Varroa mites attached to the bees between a treated hive and an untreated hive or for a hive before treatment versus the same hive after treatment. A 50% reduction means that the treated animal carries half as many mites as the untreated animal. A reduction of 100% means that the animal no longer carries mites.

Advantageously, the use according to the invention and the implementation of the method according to the invention does not affect the survival of the animal. When the animal is a bee, preferably less than 20% of the bees are killed by treating the hive with the compound of formula (I), preferably less than 15%, less than 10%, less than 5%, ideally none bee is killed.

The exposure to the compound can be done by contacting the mite with the compound of formula (I), for example by evaporation, by sublimation, by smoking, by dusting or by vaporization of the compound of formula (I) or the salt thereof. The exposure of the mite can also take place after the animal has ingested the compound of formula (I) or salt thereof.

The exposure can take place to prevent the infestation or to treat the infestation by the mite. When the animal is a bee and the mite is a Varroa mite, the exposure to the compound of formula (I), a salt thereof or the composition containing same may take place in the spring if the Varroa populations in the apiary are too high, at the beginning of summer for beekeepers wishing to leave the supers to obtain buckwheat or calluna honey, or at the end of summer just after the last honey flow (end of July/mid-August). The exposure can also take place in winter.

The compound of formula (I), the salt thereof or the composition containing same can be applied to at least part of the animal.

When the animal is a bee and the mite is a Varroa mite, compound of formula (I), the salt thereof or the composition containing same can be applied to at least part of the hive, for example at the entrance of the hive on a device placed in the hive, for example a strap, directly on the bees or directly on the Varroa mites. The form in which the compound is applied can be varied, as long as it allows to have the desired Varroacid effect, for example in the form of a powder, in the form of a gel, in the form of a polymer, in the form of smoke, in the form of solution, etc.

In a particular embodiment, the compound of formula (I) is combined, in a composition, with one or more attractants for bees. Attractant(s) for bees are widely described in the literature, for example in patent EP0499510B1. Among the attractant(s) for bees, mention may be made, for example, of geraniol, citral, nerolic acid, lemongrass, farnesol and/or the constituents of royal jelly such as adipic acid, pinelic acid, suberic acid and/or 4-hydroxybenzoic acid. (See the article "Compounds which affect the behavior of the honeybee Apis mellifera—Bee world 69-1988-104-123). The addition of one or more attractants for bees to the compound of formula (I) allows to attract bees. The bees will therefore naturally move towards the compound of formula (I) and therefore find themselves in contact with said compound of formula (I). Consequently, the bees will self-apply the compound of formula (I) to at least part of their body.

Composition

The description relates to a composition comprising a compound of formula (I) or a salt thereof, and one or more polymer(s) selected from a plastic material, a rubber, an adhesive, a resin and polysaccharide fibers, said formula (I) is:

(I)

wherein:
A is selected from the group (II) or (III):

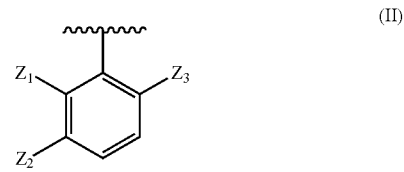

(II)

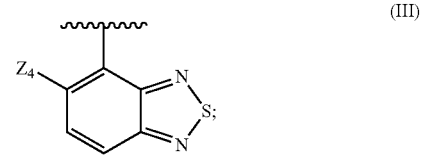

(III)

X is NH, CH$_2$ or CH—CH$_3$;

Y is a 5-bonded heterocycle comprising at least one nitrogen atom;

Z$_1$ is a halogen, H or CH$_3$;

Z$_2$ is a halogen, H or CH$_3$;

Z$_3$ is a halogen, H or CH$_3$;

Z$_4$ is a halogen, H or CH$_3$.

According to a third aspect, the invention relates to a composition adapted for use as a Varroacid in bees, said composition comprising a compound of formula (I) or a salt thereof, one or more attractants for bees, and one or more polymer(s) selected from a plastic material, a rubber, an adhesive, a resin and polyholoside fibers, said formula (I) is:

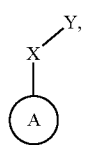

(I)

wherein:
A is selected from the group (II) or (III):

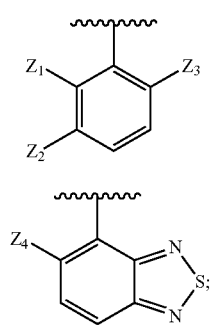

(II)

(III)

X is NH, CH$_2$ or CH—CH$_3$;

Y is a 5-bonded heterocycle comprising at least one nitrogen atom;

Z$_1$ is a halogen, H or CH$_3$;

Z$_2$ is a halogen, H or CH$_3$;

Z$_3$ is a halogen, H or CH$_3$;

Z$_4$ is a halogen, H or CH$_3$.

The plastic material may be a copolymer of ethylene and vinyl acetate (EVA copolymer).

The resin can be a natural or synthetic resin.

The polysaccharide fibers are cellulose, starch or inulin.

The composition is advantageously adapted for use as an acaricide, for example for use as an acaricide in animals. In the context of the present invention, the composition is adapted for use as a Varroacid in bees and said composition further comprises one or more attractant(s) for bees. Attractants for bees are widely described in the literature, for example in patent EP0499510B1. Among the attractant(s) for bees, mention may be made, for example, of geraniol, citral, nerolic acid, lemongrass, farnesol and/or the constituents of royal jelly such as adipic acid, pinelic acid, suberic acid and/or 4-hydroxybenzoic acid. (See the article "Compounds which affect the behavior of the honeybee *Apis mellifera*—Bee world 69-1988-104-123).

The composition must contain enough compound of formula (I) or one of the salts thereof to allow the reduction of the infestation by the mite, preferably a reduction of at least 25%, preferably of at least 50%, 55%, 60%, 65%, 70%, 75%, 80%, 85%, 90%, 95% or even 100% of the number of live mites attached to the animal. Such a reduction is advantageously obtained less than 24 hours (h) after the treatment, for example less than 12 hours, less than 6 hours or even less than 3 hours after the treatment. In a particular embodiment, such a reduction can be obtained in a hive a few days after the application of the treatment, for example at least one week, at least 2 weeks, at least 3 weeks, at least 4 weeks, at least 5 weeks, at least 6 weeks after the application of the treatment, for example up to 12 weeks after the application of the treatment.

The composition of the invention should not be toxic to bees. Preferably, less than 20% of the bees are killed when they are contacted with the composition of the invention, preferably less than 15%, less than 10%, less than 5%, ideally no bees are killed.

The concentration of compound of formula (I) or of the salt thereof is therefore adapted for killing mites without being toxic for the animal. The person skilled in the art can easily adapt the concentration according to the needs. For example, the composition of the compound of formula (I) or the composition of the salt of the compound of formula (I) contains from 0.001 to 200 µg/µL of compound of formula (I) or salt thereof, preferably of 0.01 to 100 µg/µL, from 0.1 to 100 µg/µL, for example about 0.1 µg/µL, about 1 µg/µL, about 10 µg/µL, about 25 µg/µL, about 50 µg/µL, about 75 µg/µL or even about 100 µg/µL.

Strap

According to a fourth aspect, the invention relates to a strap, preferably adapted for use in apiculture, comprising (i) a compound of formula (I), a salt thereof, a composition containing same or (ii) a composition according to the invention, said formula (I) is:

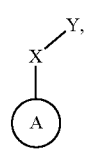

(I)

wherein:
A is selected from the group (II) or (III):

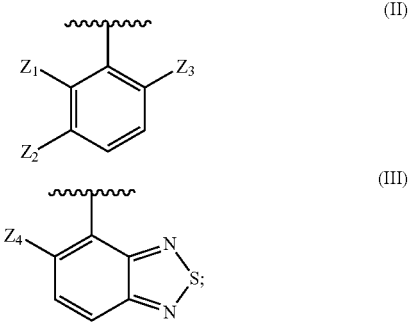

(II)

(III)

X is NH, CH$_2$ or CH—CH$_3$;
Y is a 5-bonded heterocycle comprising at least one nitrogen atom;
Z$_1$ is a halogen, H or CH$_3$;
Z$_2$ is a halogen, H or CH$_3$;
Z$_3$ is a halogen, H or CH$_3$;
Z$_4$ is a halogen, H or CH$_3$.

The straps are conventionally used in the veterinary field in acaricide treatments, for example in the form of collars for dogs or cats. Straps are also conventionally used in apiculture in Varroacid treatments. Several straps adapted for apiculture are commercially available (e.g. APIVAR® device).

In general, the acaricidal compound migrates from the inside of the strap to the surface thereof to be in contact with the animal and/or the mite. This is the case for the APIVAR® product. The bees rub at the strap to be charged with the compound. The compound is then distributed among the bees by contact. *Varroa* mites attached to the bees are thus exposed to the compound leading to the death of *Varroa* mites. *Varroa* mites then detach from the bee. In a hive, *Varroa* mites thus detached fall to the bottom of the hive.

The strap of the invention can therefore be adapted for use in apiculture. In particular, it has a size, rigidity and shape adapted to be able to slip it into a hive, that is to say so that the strap can slip between the frames of a hive. An adapted shape corresponds to a non-circular or non-curved strap, preferably a flat strap. An adapted size corresponds to a strap whose width is comprised between 1 cm and 20 cm, preferably from 4 cm to 20 cm and the length is comprised between 5 cm and 50 cm, preferably between 15 cm and 25 cm. The thickness of the strap is ideally comprised between 0.5 mm and 5 mm, preferably it is 1 mm to 2 mm thick. An adapted rigidity corresponds to a sufficient rigidity to break the bridges of beeswax which can be formed between the frames of a hive.

The strap can be impregnated or coated with the acaricidal compound, for example by spraying the strap with said compound. The strap can also be manufactured from a mixture already comprising the acaricidal compound, for example by extrusion of this mixture to give it the desired shape or by molding.

Hive

According to a fifth aspect, the invention relates to a hive comprising (i) a compound of formula (I), a salt thereof, a composition containing same, (ii) a composition according to the invention, or (iii) a strap according to the invention, the formula (I) is:

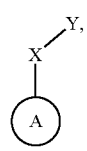

(I)

wherein:
A is selected from the group (II) or (III):

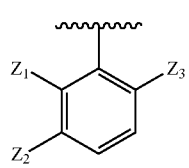

(II)

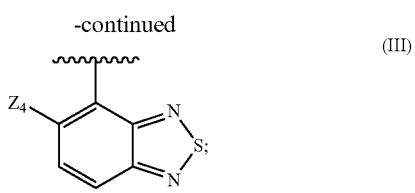

(III)

X is NH, CH$_2$ or CH—CH$_3$;
Y is a 5-bonded heterocycle comprising at least one nitrogen atom;
Z$_1$ is a halogen, H or CH$_3$;
Z$_2$ is a halogen, H or CH$_3$;
Z$_3$ is a halogen, H or CH$_3$;
Z$_4$ is a halogen, H or CH$_3$.

The hive comprises a sufficient amount of (i) compound of formula (I), salt thereof or composition containing same, (ii) composition according to the invention, or (iii) strap(s) according to the invention.

In a particular embodiment, all or part of the hive is covered with the acaricidal compound, for example by spraying the hive with said compound.

In another particular embodiment, the hive comprises a colony of bees and the colony of bees is covered with the acaricidal compound, for example by spraying the colony with said compound.

In another particular embodiment, the hive comprises one or more straps according to the invention.

Other Objects

Another object relates to a nutritional composition for bees comprising the compound of formula (I) as defined in "Definition of the compound of formula (I)". The nutritional composition for bees can be in different forms, for example in the form of a syrup for bees, a sweet paste or a protein paste for bees.

Another object relates to a device for veterinary use, for example in apiculture, comprising the compound of formula (I) as defined in "Definition of the compound of formula (I)". The device can be a strap or a beehive. The device can be impregnated or coated with the acaricidal compound, for example by spraying the device with said compound. The device can also be manufactured from a mixture already comprising the acaricidal compound, for example by extrusion of this mixture to give it the desired shape or by molding.

Another object relates to a compound of formula (I) as defined in "Definition of the compound of formula (I)" for use in the treatment or prevention of an infestation by a mite as defined above in an animal.

BRIEF DESCRIPTION OF THE FIGURES

FIG. 1A-1B is a diagram which represents the toxicity of certain solvents towards *Varroa* mites and bees. The negative control corresponds to untreated bees, that is to say having received no thoracic deposition.

FIG. 2A-2B is a diagram that measures the Varroacid effect of amitraz (FIG. 2A) and its effect on bees (FIG. 2B). The negative control corresponds to untreated bees, that is to say having received no thoracic deposition. The solvent allowed to solubilize the molecule and/or to carry out dilutions or concentrations.

FIG. 3A-3B is a diagram that measures the Varroacid effect of clonidine hydrochloride (FIG. 3A) and its effect on bees (FIG. 3B). The negative control corresponds to untreated bees, that is to say having received no thoracic deposition. The solvent allowed to solubilize the molecule and/or to carry out dilutions or concentrations.

FIG. 4A-4B is a diagram that measures the Varroacid effect of Detomidine hydrochloride monohydrate (FIG. 4A) and its effect on bees (FIG. 4B). The negative control corresponds to untreated bees, that is to say having received no thoracic deposition. The solvent allowed to solubilize the molecule and/or to carry out dilutions or concentrations.

FIG. 5A-5B is a diagram that measures the Varroacid effect of dexmedetomidine hydrochloride (FIG. 5A) and its effect on bees (FIG. 5B). The negative control corresponds to untreated bees, that is to say having received no thoracic deposition. The solvent allowed to solubilize the molecule and/or to carry out dilutions or concentrations.

FIG. 6A-6B is a diagram that measures the Varroacid effect of romifidine hydrochloride (FIG. 6A) and its effect on bees (FIG. 6B). The negative control corresponds to untreated bees, that is to say having received no thoracic deposition. The solvent allowed to solubilize the molecule and/or to carry out dilutions or concentrations.

FIG. 7A-7B is a diagram that measures the Varroacid effect of tizanidine hydrochloride (FIG. 7A) and its effect on bees (FIG. 7B). The negative control corresponds to untreated bees, that is to say having received no thoracic deposition. The solvent allowed to solubilize the molecule and/or to carry out dilutions or concentrations.

FIG. 8A-8B is a diagram that measures the Varroacid effect of medetomidine hydrochloride (FIG. 8A) and its effect on bees (FIG. 8B). The negative control corresponds to untreated bees, that is to say having received no thoracic deposition. The solvent allowed to solubilize the molecule and/or to carry out dilutions or concentrations.

FIG. 9 represents the Varroacid effect of dexmedetomidine hydrochloride by bee feeding. The negative control corresponds to bees receiving only pure syrup.

FIG. 10A-10B is a diagram that measures the Varroacid effect of levmedetomidine hydrochloride (FIG. 10A) and its effect on bees (FIG. 10B). The negative control corresponds to untreated bees, that is to say having received no thoracic deposition. The solvent allowed to solubilize the molecule and/or to carry out dilutions or concentrations.

FIG. 11A-11B is a diagram that measures the Varroacid effect of Octopamine (FIG. 11A) and its effect on bees (FIG. 11B). The negative control corresponds to untreated bees, that is to say having received no thoracic deposition. The solvent allowed to solubilize the molecule.

FIG. 12 is a photograph showing feeding units for rearing ticks.

EXAMPLES

Figure 13:
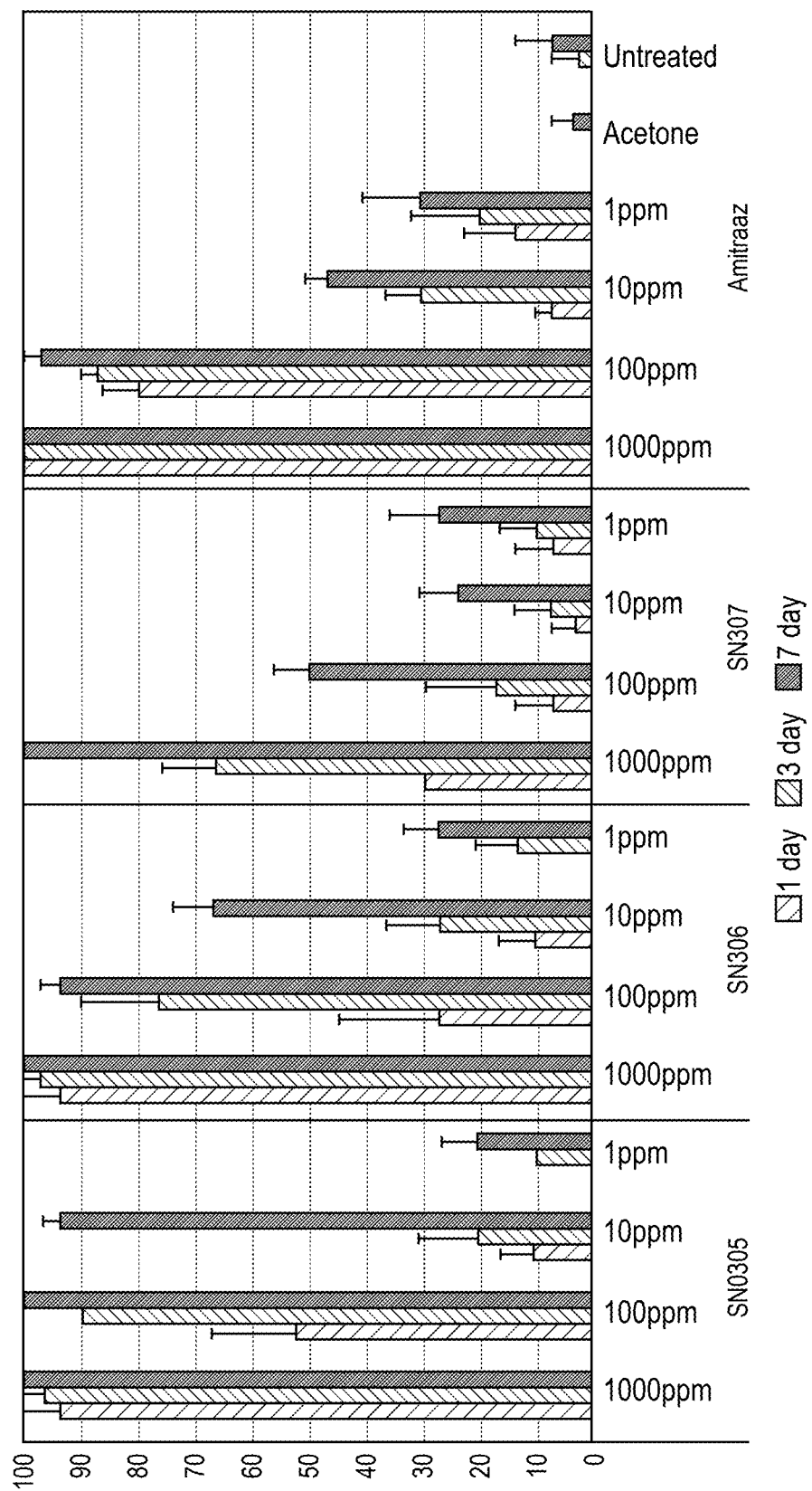
FIG. 13 is a diagram representing the percentage of dead ticks according to the different treatments over a period of 7 days.

Example 1: Demonstration of the Acaricidal Effect of the Compound of Formula (I) Against *Varroa destructor*

Materials and Methods

Preparation of *Varroa* Mites

About 300 bees (*Apis mellifera*) infected with *Varroa destructor* were taken from a hive superinfected with *Varroa destructor*. The bees were then placed in a device allowing to detach *Varroa* mites attached to the bees (device described in Community model n° 003419415-0001) filled with icing sugar. The device was stirred for 2 minutes to sample the *Varroa* mites attached to the bees. The icing sugar allows to interfere between the bee and the *Varroa* mite that was attached thereto. *Varroa* mites were harvested with icing sugar because they pass through the holes in the device, unlike bees. The *Varroa* mites were then separated from the icing sugar.

The *Varroa* mites thus recovered were dispatched in boxes (10 *Varroa* mites per box). Two boxes were used to test each compound at the same dose, in order to have data for 20 *Varroa* mites.

Preparation of the Bees

The bees were harvested from hives which had not undergone any treatment during the last 6 months in order to be sure that the effect of the experiments did not come from a previous treatment.

The bees were then dispatched in the boxes (10 per box). Two boxes were used to test the same compound at the same dose, in order to have data for 20 bees.

The bees were then put to sleep for a few minutes using $CO_2$ (flow of 3 liters for 20 seconds) in order to deposit 1 µL of compound to be tested on their thorax using a pipette. It should be noted that the bees which received romifidine hydrochloride at a concentration of 10 µg/µL received 2 µL of product. The bees were unconscious for the time the compound to be tested was deposited, that is to say around three minutes, then they woke up.

After thoracic deposition of the compound to be tested, the 10 bees from the same box were transferred to a box containing the 10 *Varroa* mites (cf. "Preparation of *Varroa* mites" above). Liquid sugar was left in each of the boxes to feed the bees during the observations. The series of boxes was then placed in an oven at 25° C. with a humidity of 50% in order to approximate hive conditions as closely as possible. It is made sure that after 5 minutes all the *Varroa* mites were attached to the bees.

Effect of the Compound on *Varroa* Mites and the Bees

The mortality of *Varroa* mites and bees was then monitored 5 minutes, 2 hours, 4 hours and 24 hours after application of the compound to be tested to the bees. Dead *Varroa* mites correspond to *Varroa* mites detached from the bees. Dead bees correspond to bees which no longer move and which are often placed on their thorax.

Test of the Solvents Used

The solvents were tested in order to be sure that they had no (positive or negative) impact on the results. Four solvents were tested: ethanol, methanol, acetone and acetonitrile.

Results

The results are shown in FIG. 1. The solvents tested did not prove to be significantly toxic either for *Varroa* mites or for bees.

Conclusion

The solvents tested had no impact on the viability of bees and *Varroa* mites. They can therefore be used to dilute the tested compounds.

Test of the Compounds

Tested Compounds

The following compositions were applied to the thorax of the bees:

Solvent,
Amitraz at 1 µg/µL in acetone,
Clonidine hydrochloride at 100 µg/µL, 10 µg/µL, 1 µg/µL and 0.1 µg/µL in methanol,
Detomidine hydrochloride monohydrate at 1 µg/µL in methanol, Dexmedetomidine hydrochloride at 100 μg/μL, 10 μg/μL, 1 μg/μL and 0.1 μg/μL in methanol,
Romifidine hydrochloride at 10 μg/μL and at 5 μg/μL in methanol,
Tizanidine hydrochloride at 1 μg/μL in methanol,
Medetomidine hydrochloride at 0.1 μg/μL in ethanol,
Levomedetomidine hydrochloride at 100 μg/μL, 10 μg/μL, 1 μg/μL and 0.1 μg/μL in methanol,
Octopamine at 1 μg/μL in ethanol.

Results

Amitraz: 100% of the *Varroa* mites were killed and 0% of the bees were killed (FIG. 2). As expected, amitraz is very effective in the fight against *Varroa* mites. Amitraz is a positive control.

Clonidine hydrochloride: the results are presented in FIG. 3. At concentrations of 100 μg/μL and 10 μg/μL, the mortality of *Varroa* mites reached 85% for only 10% of the bees killed. Surprisingly, the efficiency of the compound against *Varroa* mites was particularly marked at the concentration of 1 μg/μL with zero mortality for bees and 95% mortality for *Varroa* mites. The kinetics of this molecule appeared rather slow compared to the positive control because it showed its full efficiency after 24 hours.

Detomidine hydrochloride monohydrate: the results are presented in FIG. 4. Detomidine hydrochloride monohydrate proved to be particularly effective since after 2 hours, 40% of the *Varroa* mites were killed without mortality for the bees. After 24 hours, 100% of *Varroa* mites were killed without mortality for the bees.

Dexmedetomidine hydrochloride: the results are presented in FIG. 5. The results revealed that only the concentration of 100 μg/μL is toxic for bees. At other concentrations (10 μg/μl; 1 μg/μl; 0.1 μg/μl) mortality of less than 5% for bees, and systematically 100% mortality for *Varroa* mites after 24 hours were observed. *Varroa* was therefore sensitive to this compound.

Romifidine hydrochloride: the results are presented in FIG. 6. The molecule proved to be very effective. After 2 hours after depositing 2 μl of product at 10 μg/μL, the mortality of *Varroa* mites was 75% then 95% after 4 hours. For the concentration at 5 μg/μL, it took 24 hours to obtain the same level of mortality for *Varroa* mites. Bee mortality remained zero at all doses and even after 24 hours (diagram not shown).

Tizanidine hydrochloride: the results are shown in FIG. 7. The product proved to be very effective at 1 μg/μL after 24 hours (80% *Varroa* mite mortality) without toxicity for bees.

Medetomidine hydrochloride: the results are shown in FIG. 8. The product proved to be very effective.

Levomedetomidine hydrochloride: the results are shown in FIG. 10. The results are similar to those obtained with dexmedetomidine. *Varroa* mites were therefore sensitive to this compound.

Octopamine: the results are shown in FIG. 11. No Varroacid effect was observed. Bee mortality also remained zero.

Example 2: Exposure to the Compound of Formula (I) by Feeding

Bees and *Varroa* mites were obtained and contacted as detailed in Example 1 (without the treatment step).
The bees on which the *Varroa* mites are attached (10 bees placed in contact with 10 *Varroa* mites) were fed with:
A pure syrup (Negative control), or
A syrup comprising dexmedetomidine hydrochloride at 100 μg/mL syrup.

The syrup was provided to the bees ad libitum in 1.5 mL eppendorf tubes.

Results

The results are presented in FIG. 9 for the Varroacid effect and in Table 1 for the toxicity on bees.

TABLE 1

| % bee mortality | 5 min | 1 h | 2 h | 3 h 30 | 3 h 45 | 24 h |
| --- | --- | --- | --- | --- | --- | --- |
| Negative control | 0 | 0 | 0 | 0 | 0 | 0 |
| Dexmedetomidine 100 μg/mL syrup | 0 | 0 | 5% | 5% | 5% | 5% |

Example 3: Demonstration of the Acaricidal Effect of Compounds According to the Invention Against *Ixodes ricinus*

Compounds Tested According to the Invention
SN0305: Dexmedetomidine hydrochloride
SN0306: Medetomidine hydrochloride
SN0307: Detomidine hydrochloride Summary A laboratory study was conducted to determine the oral acaricidal properties of three compounds according to the invention (SN0305, SN0306 and SN0307) against *Ixodes ricinus*. Each compound was tested at 1, 10 and 100 ppm, and compared to a negative control corresponding to solvent alone (0.1% DMSO). Amitraz at 100 ppm was used as a positive control.

The *Ixodes ricinus* ticks (nymphs and adults) were placed for 24 hours on a membrane in feeding wells containing blood mixed with the tested compounds. Tick mortality (number of dead, moribund, or unaffected ticks in each well), attachment to the membrane (number of ticks attached/detached in each well), and the behavior (presence or absence of twitches) were examined 1, 3, 6, 12, 24, 48, 72, and 96 hours after the onset of tick exposure to the compounds.

Methodology

Test System—Arthropods

Ticks (*Ixodes ricinus*) were collected. Collected adult females were kept separate from the nymphs and both were placed in sterile tubes in a humidity chamber to provide ~80% humidity and 17° C. Only healthy ticks (females/nymphs) were chosen for the experiment.

Batches of 12 adults or nymphs were inserted into the feeding wells. After about 24 hours, their attachment was examined with a brush. Dead or moribund ticks and ticks that did not attach were removed.

Test Article—Compounds

The efficiency of three compounds (SN0305, SN0306 and SN0307), each tested at three concentrations (1, 10, 100 ppm), was compared to the solvent control (0.1% DMSO, Sigma-Aldrich D-5879; Lot 101K0028) and to the positive control (Amitraze at 100 ppm).

Membranes

Silicone-coated membranes with a thickness comprised between 110 and 140 μm were used for the construction of the feeding units.

Feeding Units

Feeding units (sterilized acrylic glass tubes) were placed in feeding wells made of sterilized six-well plates.

3.1 ml of sterile $10^{-3}$ M ATP-enriched blood was applied to each feeding well. Feeding wells were then inserted into a heated water bath (FIG. 12) and maintained at 37° C.±2° C.

Tested Compounds and Application

Stock solutions of 100,000 ppm were prepared and tenth dilutions were carried out in 0.1% DMSO to reach the desired concentrations. After tick attachment (24 hours after placing the ticks in the feeding wells), 3.1 µl of the solutions were added to each feeding well containing 3.1 ml of blood. Blood was changed after 12 hours with fresh supplementation of the compounds to be tested. The ticks were exposed to the product for a total of 24 hours, after which the blood was again changed to fresh, untreated blood.

Evaluations

Tick mortality (number of dead, moribund or unaffected ticks in each well), attachment (number of attached/detached ticks in each well) and behavior (presence, absence and intensity of convulsions) were examined 1, 3, 6, 12, 24, 48, 72, and 96 hours after the start of tick exposure to the compound.

Results

Convulsion, Morbidity or Death of Ticks

The three tested compounds (SN0305, SN0306 and SN0307), regardless of the concentration tested, showed a strong effect on ticks from 1 hour of exposure (convulsion, morbidity or death of ticks). 100% of ticks were affected. The amitraz positive control obtained a comparable result for nymphs, but a much weaker effect was observed on adult ticks (Table 2). No effect was observed for the solvent (negative control) during the 96 h of the experiment.

TABLE 2 average percentage of affected adult ticks (convulsion, morbidity or death of ticks) after the start of oral exposure to amitraz at 100 ppm.

| Time (h) | 1 | 3 | 6 | 12 | 24 | 48 | 72 | 96 |
|---|---|---|---|---|---|---|---|---|
| % affected | 66.8 | 56.2 | 53.7 | 56.2 | 66.5 | 83.1 | 100.0 | 100.0 |

Detachment of Ticks

The three products tested (SN0305, SN0306 and SN0307) showed a very limited effect in terms of tick detachment. Only very isolated cases were observed: 1 detached nymph in a replica of SN0305 at 1 ppm, 1 detached adult tick in a replica of SN0305 at 100 ppm, 2 detached adults in a replica of SN0307 at 1 ppm. 55% of fully fed nymphs released naturally between 72 and 96 h in the solvent control. No adult ticks were detached in the solvent control.

Amitraz has induced a strong detachment of adult ticks (Table 3).

TABLE 3 average percentage of attached adult ticks after the start of exposure to amitraz at 100 ppm.

| Time (h) | 1 | 3 | 6 | 12 | 24 | 48 | 72 | 96 |
|---|---|---|---|---|---|---|---|---|
| % attached | 66.8 | 56.2 | 53.7 | 53.7 | 53.7 | 53.7 | 53.7 | 53.7 |

Tick Mortality

The three products tested (SN0305, SN0306 and SN0307) caused 100% mortality (moribund or dead ticks) in nymphs and adult ticks after 96 h. Amitraz caused 100% mortality in nymphs and 97.5% in adults. No mortality was observed with the solvent (Tables 4 and 5).

TABLE 4 average percentage of mortality of tick nymphs (moribund or dead nymphs) exposed to SN0305, SN0306 and SN0307 at 1, 10 and 100 ppm, solvent control (0.1% DMSO) or Amitraz at 100 ppm.

| Product | Conc. (ppm) | 1 h | 3 h | 6 h | 12 h | 24 h | 48 h | 72 h | 96 h |
|---|---|---|---|---|---|---|---|---|---|
| 305 | 1 | 0.0 | 0.0 | 13.8 | 31.3 | 58.9 | 85.7 | 100.0 | 100.0 |
| 305 | 10 | 0.0 | 9.2 | 24.9 | 48.3 | 83.0 | 96.9 | 100.0 | 100.0 |
| 305 | 100 | 0.0 | 13.3 | 33.0 | 59.0 | 92.9 | 100.0 | 100.0 | 100.0 |
| 306 | 1 | 0.0 | 0.0 | 19.5 | 38.9 | 61.8 | 93.9 | 100.0 | 100.0 |
| 306 | 10 | 0.0 | 10.4 | 38.4 | 58.5 | 78.7 | 85.0 | 95.8 | 100.0 |
| 306 | 100 | 0.0 | 9.1 | 38.5 | 69.2 | 94.4 | 100.0 | 100.0 | 100.0 |
| 307 | 1 | 0.0 | 0.0 | 14.1 | 35.4 | 56.4 | 97.2 | 100.0 | 100.0 |
| 307 | 10 | 0.0 | 12.7 | 35.5 | 54.7 | 88.1 | 100.0 | 100.0 | 100.0 |
| 307 | 100 | 0.0 | 9.4 | 45.3 | 69.5 | 95.5 | 100.0 | 100.0 | 100.0 |
| Amitraz | 100 | 0.0 | 14.0 | 38.7 | 74.9 | 100.0 | 100.0 | 100.0 | 100.0 |
| Solvent | 0.1% DMSO | 0.0 | 0.0 | 0.0 | 0.0 | 0.0 | 0.0 | 0.0 | 0.0 |

TABLE 5 average percentage of adult tick mortality (moribund or dead adult ticks) exposed to SN0305, SN0306 and SN0307 at 1, 10 and 100 ppm, solvent (0.1% DMSO) or AMITRAZE at 100 ppm. Survival of adult ticks in amitraz treatment may be caused by early detachment of ticks.

| Product | Conc, (ppm) | 1 h | 3 h | 6 h | 12 h | 24 h | 48 h | 72 h | 96 h |
|---|---|---|---|---|---|---|---|---|---|
| 305 | 1 | 0.0 | 0.0 | 3.1 | 3.1 | 64.2 | 88.2 | 100.0 | 100.0 |
| 305 | 10 | 0.0 | 0.0 | 5.6 | 11.1 | 57.3 | 79.5 | 96.9 | 100.0 |
| 305 | 100 | 0.0 | 0.0 | 5.9 | 11.8 | 63.9 | 76.4 | 91.3 | 100.0 |
| 306 | 1 | 0.0 | 0.0 | 2.3 | 7.3 | 47.6 | 97.7 | 100.0 | 100.0 |
| 306 | 10 | 0.0 | 0.0 | 9.6 | 9.6 | 53.9 | 91.2 | 100.0 | 100.0 |
| 306 | 100 | 0.0 | 0.0 | 12.5 | 18.1 | 53.1 | 84.7 | 93.8 | 100.0 |

TABLE 5-continued average percentage of adult tick mortality (moribund or dead adult ticks) exposed to SN0305, SN0306 and SN0307 at 1, 10 and 100 ppm, solvent (0.1% DMSO) or AMITRAZE at 100 ppm. Survival of adult ticks in amitraz treatment may be caused by early detachment of ticks.

| Product | Conc, (ppm) | 1 h | 3 h | 6 h | 12 h | 24 h | 48 h | 72 h | 96 h |
|---|---|---|---|---|---|---|---|---|---|
| 307 | 1 | 0.0 | 0.0 | 2.8 | 2.8 | 62.9 | 88.2 | 100.0 | 100.0 |
| 307 | 10 | 0.0 | 0.0 | 8.3 | 8.3 | 52.1 | 96.4 | 100.0 | 100.0 |
| 307 | 100 | 0.0 | 0.0 | 8.8 | 15.4 | 24.0 | 57.4 | 100.0 | 100.0 |
| Amitraz | 100 | 0.0 | 2.8 | 10.1 | 17.4 | 27.7 | 58.9 | 84.6 | 97.5 |
| solvent | 0.1% DMSO | 0.0 | 0.0 | 0.0 | 0.0 | 0.0 | 0.0 | 0.0 | 0.0 |

Conclusion

All the tested compounds showed an acaricidal effect on *Ixodes ricinus*.

Example 4: Demonstration of the Acaricidal Effect of Compounds According to the Invention Against *Rhipicephalus sanguineus*

Summary

A laboratory study was conducted to determine the acaricidal properties of three compounds according to the invention (SN0305, SN0306 and SN0307) against *Rhipicephalus sanguineus*. Each compound was tested at 1, 10 and 100 ppm, and compared to a negative control corresponding to solvent alone (0.1% DMSO). Amitraz at 100 ppm was used as a positive control.

Methodology

Test Systems

Brown dog ticks, *Rhipicephalus sanguineus*, of $2^{nd}$ stage, from a single cohort were used.

Tested Compounds and Application

Three (3) compounds were tested, as well as a reference compound (Amitraze). For each compound tested and Amitraz, four doses (1000, 100, 10 and 1 ppm) were applied to the ticks topically. A negative control (acetone) and an untreated group were included for comparison. The experiments were carried out in triplicate.

Experimental Protocol

Ten ticks were placed in a clear plastic container, measuring approximately 120 mm in diameter and 45 mm in height. The ticks were then anesthetized by direct exposure (for 10 seconds) to carbon dioxide. The treatments were then applied to the back (scutum) of each tick, using a Hamilton syringe, up to 0.5 µl of treatment per tick (1 application).

Cotton soaked in water was placed in each container to provide humidity throughout the experiment. The container was also vented throughout the experiment with a tube to introduce air into each container. The containers were maintained at a temperature of 23±3° C. Live, shocked and dead tick counts were taken daily after treatment for 7 days.

Statistical Analyzes

The averages in percentage of each evaluation category (healthy, knocked down and dead) were calculated, as well as the standard error. An analysis of variance (ANOVA) was performed using Minitab software, $16^{th}$ edition.

Results and Conclusions

Figure 14:
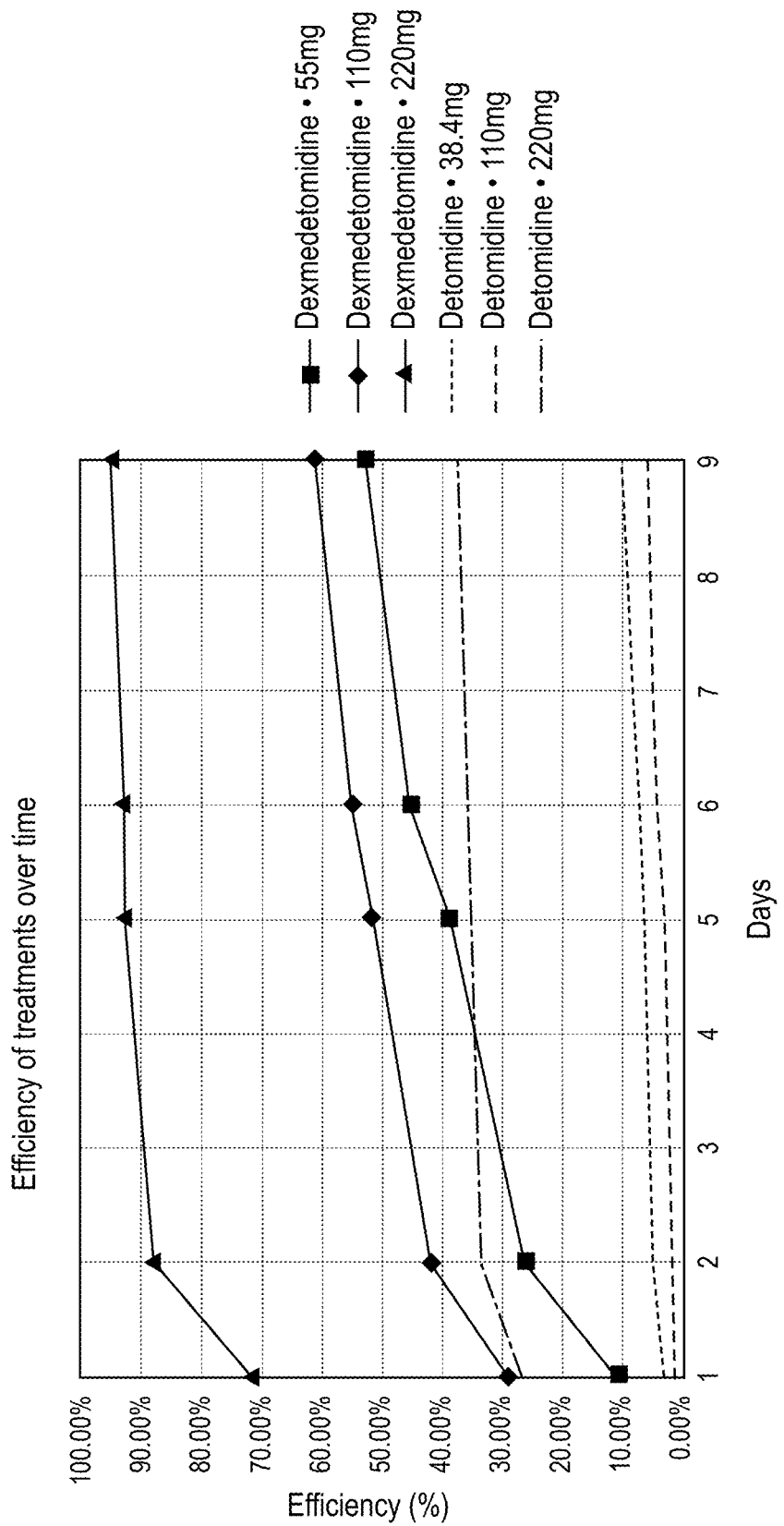
FIG. 14 is a diagram that measures the cumulative efficiency of the tested compounds as a function of treatment time against *Varroa* mites in beehives.

The results are shown in FIG. 14.

1000 ppm Treatments

The treatments at 1000 ppm resulted in 100% mortality for the compounds SN0305, SN0306, SN0307 and amitraz after 7 days of treatment, with no statistically significant difference between the compounds.

100 ppm Treatments

The 100 ppm treatments resulted in a mortality of 100%, 93.3%, 50% and 96.7% for the compounds SN0305, SN0306, SN0307 and amitraz respectively after 7 days of treatment. With a significantly higher level of mortality at 7 days for compounds SN0305, SN0306 and amitraz compared to the compound SN0307.

10 ppm Treatments

The treatments at 10 ppm resulted in a mortality of 93.3%, 66.7%, 23.3% and 46.7% for the compounds SN0305, SN0306, SN0307 and amitraz respectively after 7 days of treatment. The compound SN0305 resulted in significantly higher mortality compared to all other treatments. The compound SN0306 caused significantly higher mortality compared to SN0307, but not compared to amitraz.

Treatments at 1 ppm

The treatments at 1 ppm resulted in much lower mortality, with 20%, 26.7%, 26.7% and 30% for the compounds SN0305, SN0306, SN0307 and amitraz respectively after 7 days of treatment.

Negative Controls

The mortality observed with the controls remained low with 3.3% mortality reported with acetone and 6.7% mortality observed in the untreated control group, after 7 days.

Example 5: Demonstration of the Acaricidal Effect in the Hive and in a Situation Outside the Brood of the Compound of Formula (I) Against *Varroa destructor*

Materials and Methods

Preparation of Hives 18 hives of bees were divided into 6 groups of 3 homogeneous hives as regards the strength of the colonies (number of bees) and the *Varroa* infestation.

The queen of each hive was caged 3 weeks before the application of the tested compounds. The application of the tested compounds was therefore carried out in a situation outside the brood, which allows the forced passage of the *Varroa* mites from their reproduction phase to their phoresy phase (they are therefore all present on the bees).

The tested compounds were applied in the form of a gel three weeks after the queen was caged. The activity of the compounds was studied for a period of 9 days.

Following these 9 days of treatment, a control treatment with oxalic acid was carried out (duration of treatment equal to 1 week).

Counts of *Varroa* mites falling on the floor were carried out at regular time intervals to quantify the number of dead *Varroa* mites.

The efficiency of the treatment was calculated by taking the sum of all the dead *Varroa* mites from D0 to D9 (tested compounds) and dividing it by the sum of all the dead *Varroa* mites from D0 to D16 (tested compounds+control treatment).

The mortality of the bees was also quantified in order to demonstrate a potential toxicity of the compound tested. For this purpose, dead bee traps disposed in front of the hives were used.

Test of the Compounds

Tested Compounds

The following compounds were tested:
Dexmedetomidine at 55 mg/hive in hydrochloride form,
Dexmedetomidine at 110 mg/hive in hydrochloride form,
Dexmedetomidine at 220 mg/hive in hydrochloride form,
Detomidine at 38.4 mg/hive in hydrochloride form,
Detomidine at 110 mg/hive in hydrochloride form,
Detomidine at 220 mg/hive in hydrochloride form, Results The results concerning the calculation of the efficiency of the tested compounds are presented in FIG. 14. There clearly appears a dose effect of Dexmedetomidine on the efficiency against *Varroa* mites. The most effective dose was 220 mg/hive (94.5% total efficiency).

With regard to Detomidine, the results showed that the dose of 220 mg/hive allows to have a Varroacid effect.

Dexmedetomidine was therefore the most effective compound against *Varroa* mites.

Figure 15:
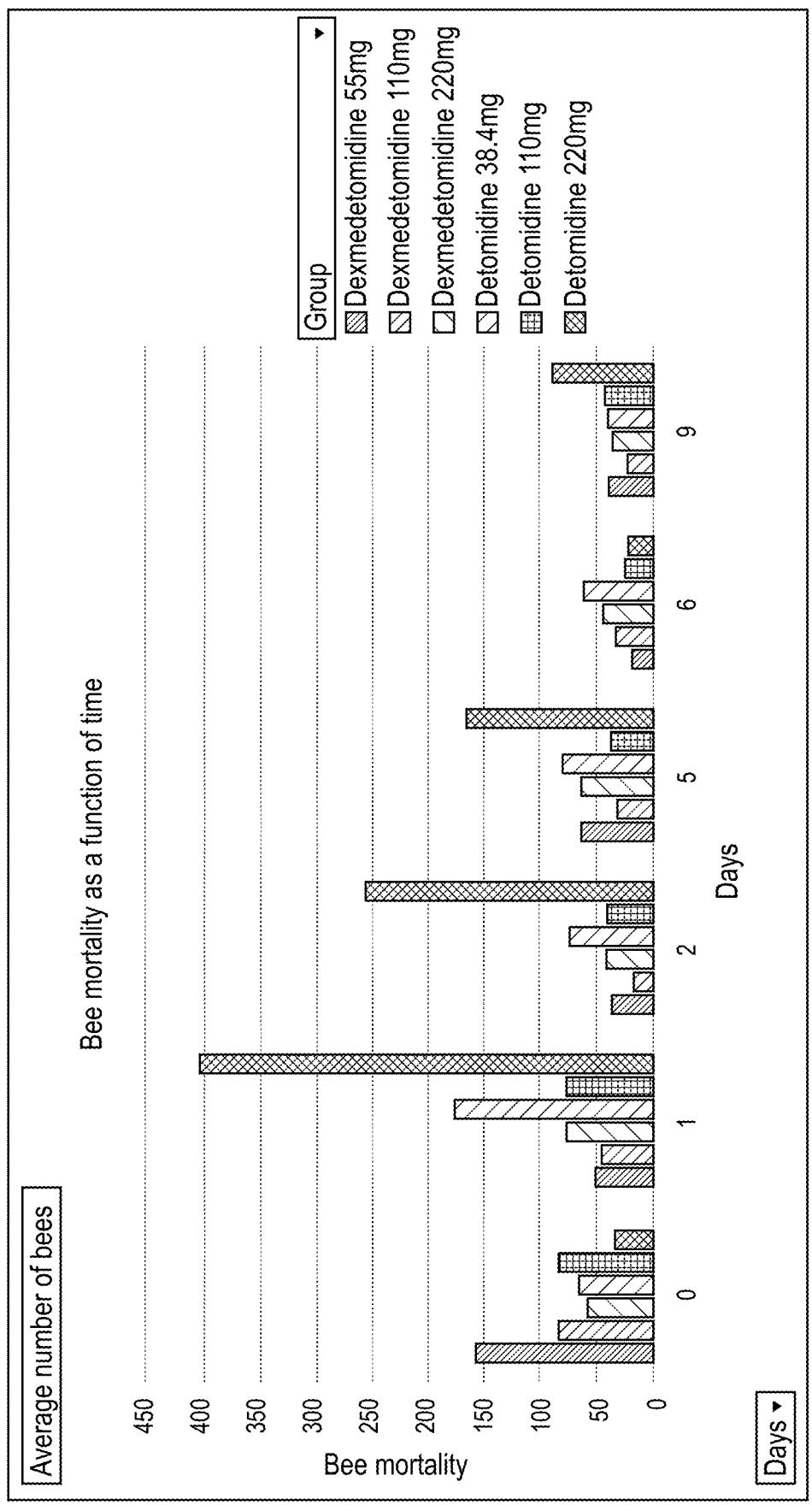
FIG. 15 is a diagram that measures the mortality of adult bees following the application of the compounds tested in beehives.

The results concerning the mortality of the bees are presented in FIG. 15. The results showed an increase in the mortality of the bees with Detomidine at 220 mg/hive. On the other hand, no increase in bee mortality was observed with Dexmedetomidine.

These results confirm the interest of Detomidine and Dexmedetomidine as a Varroacid, in particular Dexmedetomidine which requires lower doses and is not toxic to bees.

REFERENCES

[1] Macedo, P. A., WU, J., and ELLIS, Marion D. Using inert dusts to detect and assess *Varroa* infestations in honey bee colonies. Journal of Apicultural Research, 2002, vol. 41, no 1-2, p. 3-7

[2] Kretzschmar A. (2016). APIMODEL, modélisation fonctionnelle de l'activité des colonies d'abeilles pour caractériser des seuils de dysfonctionnement à l'échelle du rucher. Généralisation à partir de la miellée sur lavandes. INRA-BioSP, Avignon. http://w3.avignon.inra.fr/lavandes/biosp/rapportfinal2016.pdf

The invention claimed is:

1. A composition adapted for use as a varroacid in beehives, said composition comprising:
(i) one or more attractant(s) for bees,
(ii) one or more polymer(s) selected from a plastic material, a rubber, an adhesive, a resin and polyholoside fibers, and
(iii) a compound of formula (I), or a salt thereof, said formula (I) is:

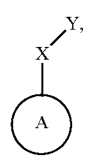
(I)

wherein:
A is selected from the group (II) or (III):

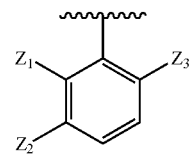
(II)

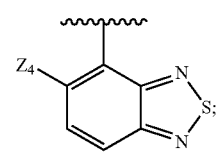
(III)

X is NH, $CH_2$ or $CH-CH_3$;
Y is a 5-bonded heterocycle comprising at least one nitrogen atom;
$Z_1$ is a halogen, H or $CH_3$;
$Z_2$ is a halogen, H or $CH_3$;
$Z_3$ is a halogen, H or $CH_3$; and
$Z_4$ is a halogen, H or $CH_3$.

2. The composition according to claim 1, wherein Y is the group (IV) or (V):

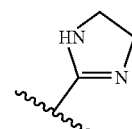
(IV)

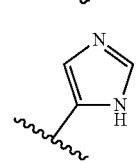
(V)

3. The composition according to claim 1, wherein:
A is the group (II), X is NH, Y is the group (IV), $Z_1$ is a halogen, $Z_2$ is H and $Z_3$ is a halogen,
A is the group (II), X is $CH_2$ or $CH-CH_3$, Y is the group (V), $Z_1$ is $CH_3$, $Z_2$ is $CH_3$ and $Z_3$ is H, or
A is the group (III), X is NH, Y is the group (IV) and $Z_4$ is a halogen.

4. The composition according to claim 1, wherein:
A is the group (II), X is NH, Y is the group (IV), $Z_1$ is selected from F, Cl or Br, $Z_2$ is H and $Z_3$ is selected from F, Cl or Br,
A is the group (II), X is $CH_2$ or $CH-CH_3$, Y is the group (V), $Z_1$ is $CH_3$, $Z_2$ is $CH_3$ and $Z_3$ is H, or
A is the group (III), X is NH, Y is the group (IV) and $Z_4$ is selected from F, Cl or Br.

5. The composition according to claim 1, wherein the compound of formula (I) is selected from detomidine, dexmedetomidine, medetomidine, romifidine, clonidine, tizanidine or a salt of one of these compounds.

6. A strap adapted for use in apiculture, comprising the composition according to claim 1.

7. The strap according to claim 6, wherein Y is the group (IV) or (V):

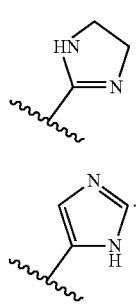

(IV)

(V)

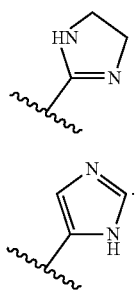

(IV)

(V)

8. The strap according to claim 6, wherein:
   A is the group (II), X is NH, Y is the group (IV), $Z_1$ is a halogen, $Z_2$ is H and $Z_3$ is a halogen,
   A is the group (II), X is $CH_2$ or CH—$CH_3$, Y is the group (V), $Z_1$ is $CH_3$, $Z_2$ is $CH_3$ and $Z_3$ is H, or
   A is the group (III), X is NH, Y is the group (IV) and $Z_4$ is a halogen.

9. The strap according to claim 6, wherein the halogen allogen is selected from F, Cl or Br.

10. The strap according to claim 6, wherein the compound of formula (I) is selected from detomidine, dexmedetomidine, medetomidine, romifidine, clonidine, tizanidine or a salt of one of these compounds.

11. A hive comprising the composition according to claim 1.

12. The hive according to claim 11, wherein Y is the group (IV) or (V):

13. The hive according to claim 11, wherein:
   A is the group (II), X is NH, Y is the group (IV), $Z_1$ is a halogen, $Z_2$ is H and $Z_3$ is a halogen,
   A is the group (II), X is $CH_2$ or CH—$CH_3$, Y is the group (V), $Z_1$ is $CH_3$, $Z_2$ is $CH_3$ and $Z_3$ is H, or
   A is the group (III), X is NH, Y is the group (IV) and $Z_4$ is a halogen.

14. The hive according to claim 11, wherein the halogen is selected from F, Cl or Br.

15. The hive according to claim 11, wherein the compound of formula (I) is selected from detomidine, dexmedetomidine, medetomidine, romifidine, clonidine, tizanidine or a salt of one of these compounds.

* * * * *